US009767471B1

(12) United States Patent
Perrone et al.

(10) Patent No.: US 9,767,471 B1
(45) Date of Patent: Sep. 19, 2017

(54) DETERMINING RECOMMENDATIONS FROM BUYER INFORMATION

(71) Applicant: Square, Inc., San Francisco, CA (US)

(72) Inventors: Gian Perrone, San Francisco, CA (US); Mai Leduc, San Francisco, CA (US); John Coughlin, San Francisco, CA (US); Abhay Kumar, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 298 days.

(21) Appl. No.: 14/284,980

(22) Filed: May 22, 2014

Related U.S. Application Data

(60) Provisional application No. 61/969,720, filed on Mar. 24, 2014.

(51) Int. Cl.
G06Q 30/00 (2012.01)
G06Q 30/02 (2012.01)
G06Q 20/20 (2012.01)

(52) U.S. Cl.
CPC ......... *G06Q 30/0205* (2013.01); *G06Q 20/20* (2013.01); *G06Q 30/0255* (2013.01)

(58) Field of Classification Search
CPC .................................................. G06Q 30/0255
USPC .................. 705/14.25, 14.38, 14.53, 16, 26.7
See application file for complete search history.

(56) References Cited

U.S. PATENT DOCUMENTS

| 6,128,415 | A | 10/2000 | Hultgren, III et al. |
| 6,505,168 | B1 | 1/2003 | Rothman et al. |
| 6,694,300 | B1* | 2/2004 | Walker ............. G06Q 30/02 705/14.25 |
| 7,092,929 | B1 | 8/2006 | Dvorak et al. |
| 7,379,916 | B1 | 5/2008 | Mizrah |
| 8,175,908 | B1 | 5/2012 | Anderson |
| 8,868,522 | B1 | 10/2014 | Zennaro et al. |
| 2001/0014868 | A1 | 8/2001 | Herz et al. |
| 2001/0047308 | A1 | 11/2001 | Kaminsky et al. |
| 2002/0087384 | A1* | 7/2002 | Neifeld ............. G06Q 30/02 705/26.1 |
| 2002/0143655 | A1 | 10/2002 | Elston et al. |

(Continued)

OTHER PUBLICATIONS

Non-Final Office Action mailed Oct. 5, 2015, for U.S. Appl. No. 14/284,856 of Perrone, G., et al., filed May 22, 2014.

(Continued)

Primary Examiner — Hunter Wilder
(74) Attorney, Agent, or Firm — Lee & Hayes, PLLC

(57) ABSTRACT

A service provider may receive transaction information from a plurality of merchant devices for a plurality of point of sale transactions conducted between buyers and merchants. The service provider can associate the transaction information with respective buyer profiles of a plurality of buyer profiles. In some examples, the service provider may determine a subset of the buyer profiles based on at least a portion of the buyer profiles in the subset including transaction information that is related to a particular one of the merchants. The service provider may further determine at least one characteristic associated with at least some of the buyer profiles in the subset, and may send a recommendation to the particular merchant related to the at least one characteristic. As an example, the recommendation may be for improving or optimizing the business of the particular merchant.

23 Claims, 13 Drawing Sheets

(56) References Cited

U.S. PATENT DOCUMENTS

| | | |
|---|---|---|
| 2003/0132298 A1 | 7/2003 | Swartz et al. |
| 2003/0191709 A1 | 10/2003 | Elston et al. |
| 2004/0198389 A1 | 10/2004 | Alcock et al. |
| 2005/0060245 A1 | 3/2005 | Hoffman et al. |
| 2005/0139662 A1 | 6/2005 | Eglen et al. |
| 2006/0064392 A1 | 3/2006 | Glisson |
| 2006/0223508 A1 | 10/2006 | Starr et al. |
| 2006/0237531 A1 | 10/2006 | Heffez et al. |
| 2007/0130090 A1 | 6/2007 | Staib et al. |
| 2007/0179836 A1 | 8/2007 | Juang et al. |
| 2007/0250440 A1 | 10/2007 | Paulsen et al. |
| 2007/0250441 A1 | 10/2007 | Paulsen et al. |
| 2007/0270165 A1 | 11/2007 | Poosala |
| 2008/0033805 A1 | 2/2008 | Padin |
| 2008/0249837 A1* | 10/2008 | Angell ............ G06Q 10/06375 705/7.33 |
| 2008/0262935 A1 | 10/2008 | Baumgartner et al. |
| 2009/0076896 A1 | 3/2009 | DeWitt et al. |
| 2009/0076925 A1 | 3/2009 | DeWitt et al. |
| 2009/0094237 A1 | 4/2009 | Churi et al. |
| 2010/0076813 A1 | 3/2010 | Ghosh et al. |
| 2010/0274680 A1 | 10/2010 | Carlson et al. |
| 2010/0306032 A1 | 12/2010 | Jolley |
| 2011/0004506 A1 | 1/2011 | May et al. |
| 2011/0035288 A1 | 2/2011 | Clyne |
| 2011/0087547 A1 | 4/2011 | Amaro et al. |
| 2011/0093326 A1 | 4/2011 | Bous et al. |
| 2011/0112897 A1 | 5/2011 | Tietzen et al. |
| 2011/0119122 A1 | 5/2011 | Padam et al. |
| 2011/0238517 A1 | 9/2011 | Ramalingam et al. |
| 2011/0246272 A1 | 10/2011 | Joa et al. |
| 2011/0264581 A1 | 10/2011 | Clyne |
| 2011/0302011 A1 | 12/2011 | Yoder et al. |
| 2011/0302013 A1 | 12/2011 | Dance et al. |
| 2011/0313874 A1 | 12/2011 | Hardie et al. |
| 2012/0005019 A1 | 1/2012 | LeBlanc et al. |
| 2012/0094639 A1 | 4/2012 | Carlson et al. |
| 2012/0239524 A1 | 9/2012 | Ouimet et al. |
| 2012/0290349 A1 | 11/2012 | Burkhart et al. |
| 2012/0323681 A1 | 12/2012 | Bercaw |
| 2013/0031006 A1 | 1/2013 | McCullagh et al. |
| 2013/0066740 A1 | 3/2013 | Ouimet et al. |
| 2013/0132140 A1 | 5/2013 | Amin et al. |
| 2013/0132246 A1 | 5/2013 | Amin et al. |
| 2013/0132887 A1 | 5/2013 | Amin et al. |
| 2013/0204791 A1 | 8/2013 | Dorsey et al. |
| 2013/0246207 A1 | 9/2013 | Novak et al. |
| 2013/0246301 A1 | 9/2013 | Radhakrishnan et al. |
| 2013/0276020 A1 | 10/2013 | Khan |
| 2014/0089133 A1* | 3/2014 | Argue ................ G06Q 30/0282 705/26.7 |
| 2014/0122137 A1 | 5/2014 | Nelson et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0156449 A1* | 6/2014 | Ganesan ............ G06Q 30/0631 705/26.7 |
| 2014/0180767 A1 | 6/2014 | Villars |
| 2014/0214562 A1* | 7/2014 | Cancro .............. G06Q 30/0631 705/16 |
| 2014/0214572 A1* | 7/2014 | Cancro ................ G06Q 20/208 705/21 |
| 2014/0240725 A1* | 8/2014 | Banfield ............. G06F 19/3456 358/1.6 |
| 2014/0278804 A1 | 9/2014 | Lanxner et al. |
| 2014/0344093 A1 | 11/2014 | Du et al. |
| 2015/0051994 A1 | 2/2015 | Ward et al. |
| 2015/0058088 A1 | 2/2015 | Unser et al. |
| 2015/0095228 A1 | 4/2015 | Su et al. |
| 2015/0269642 A1* | 9/2015 | Cai .................... G06Q 30/0613 705/14.49 |

OTHER PUBLICATIONS

Office Action for U.S. Appl. No. 14/284,856, mailed on Sep. 12, 2014, Gian Perrone, "Associating Transactions With Buyer Information", 14 pages.
Non-Final Office Action mailed Nov. 20, 2015, for U.S. Appl. No. 14/284,926 of Perrone, G., et al., filed May 22, 2014.
U.S. Appl. No. 14/284,856, of Perrone, G., et al., filed May 22, 2014.
U.S. Appl. No. 14/284,926, of Perrone, G., et al., filed May 22, 2014.
U.S. Appl. No. 14/289,443, of Kumar, A., et al., filed May 28, 2014.
U.S. Appl. No. 14/289,467, of Kumar, A., et al., filed May 28, 2014.
U.S. Appl. No. 14/289,469, of Kumar, A., et al., filed May 28, 2014.
Final Office Action mailed Jan. 16, 2015, for U.S. Appl. No. 14/284,856, of Perrone, G., et al., filed May 22, 2014.
"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.
Non-Final Office Action mailed Sep. 10, 2015, for U.S. Appl. No. 14/032,585 of Bourget, E W., filed Sep. 20, 2013.
Final Office Action mailed Mar. 23, 2016, for U.S. Appl. No. 14/032,585 of Bourget, E W., filed Sep. 30, 2016.
Final Office Action mailed Jun. 21, 2016, for U.S. Appl. No. 14/284,926 of Perrone, G., et al., filed May 22, 2014.
Advisory Action mailed Sep. 26, 2016, for U.S. Appl. No. 14/284,926 of Perrone, G., et al., filed May 22, 2014.
Non-Final Office Action mailed Jul. 28, 2016, for U.S. Appl. No. 14/289,469 of Kumar, A., et al., filed May 28, 2014.
Non-Final Office Action mailed Jul. 29, 2016, for U.S. Appl. No. 14/032,585 of Bourget, E.W., filed Sep. 20, 2013.
Final Office Action mailed Nov. 25, 2016, for U.S. Appl. No. 14/284,856, of Perrone, G., et al., filed May 22, 2014.
Non-Final Office Action mailed Dec. 19, 2016, for U.S. Appl. No. 14/289,443, of Kumar, A., et al., filed May 28, 2014.
Notice of Allowance mailed Dec. 23, 2016, for U.S. Appl. No. 14/289,469 of Kumar, A., et al., filed May 28, 2014.
Notice of Allowance mailed Jan. 27, 2017, for U.S. Appl. No. 14/032,585, of Bourget, E.W., filed Sep. 20, 2013.
Advisory Action mailed Feb. 24, 2017, for U.S. Appl. No. 14/284,856, of Perrone, G., et al., filed May 22, 2014.
Notice of Allowance mailed Mar. 6, 2017, for U.S. Appl. No. 14/032,585, of Bourget, E.W., filed Sep. 20, 2013.

* cited by examiner

DETERMINING RECOMMENDATIONS FROM BUYER INFORMATION

CROSS-REFERENCE TO RELATED APPLICATION

This application claims the benefit of U.S. Provisional Patent Application No. 61/969,720, filed Mar. 24, 2014, which is incorporated herein by reference in its entirety.

BACKGROUND

People conduct transactions with many different merchants for acquiring many different types of goods and services. Merchants, who are purveyors of these goods and services, often perform transactions in person with their customers at a point of sale location. However, such merchants may have very little access to information about their customers, and even less access to information about potential customers. For example, customers rarely provide much information about themselves to a merchant during an in-person transaction. Accordingly, it can be difficult for merchants to obtain customer-related information that may assist the merchants in growing and improving their businesses.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
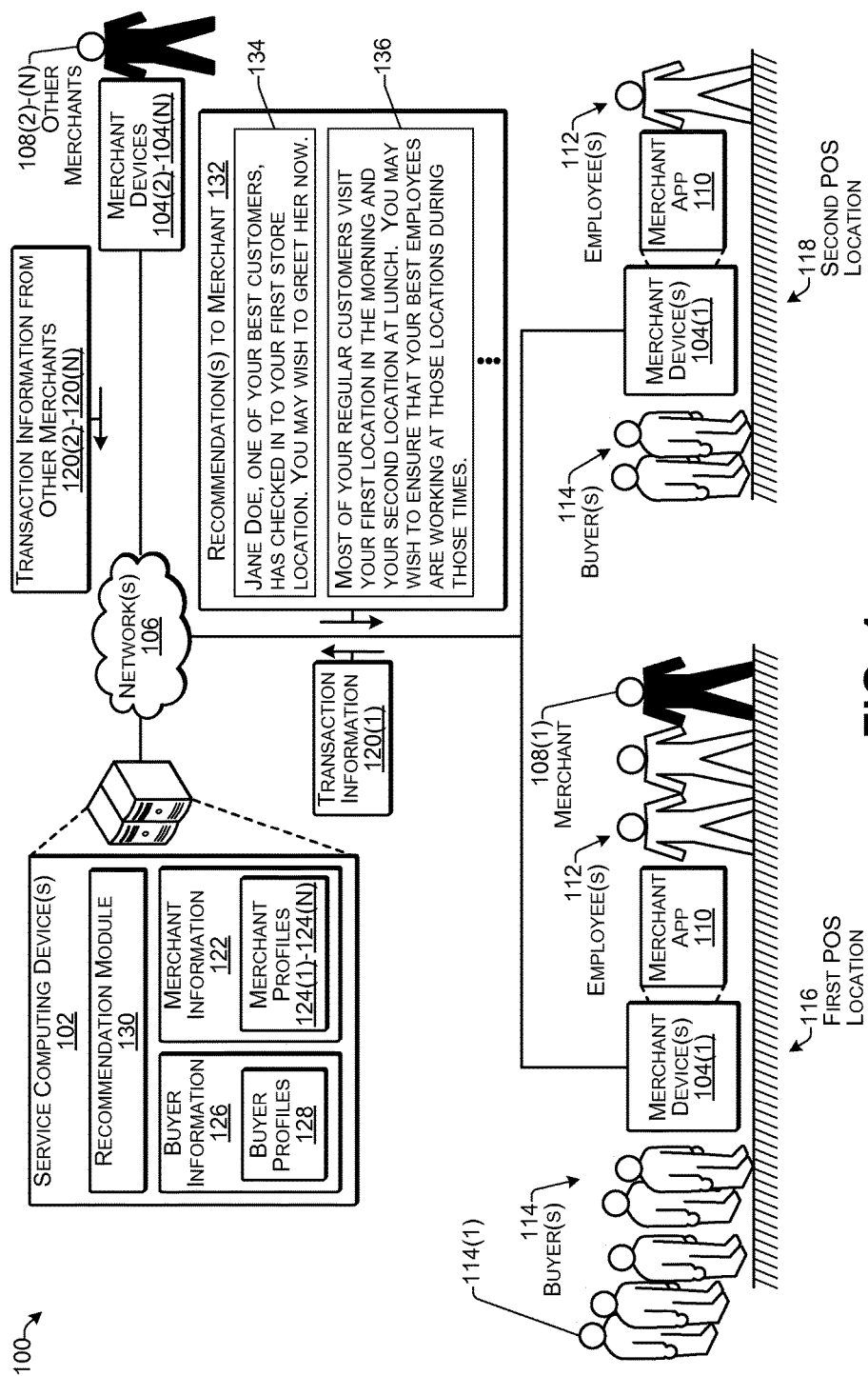
FIG. 1 illustrates an example environment for a payment and recommendation service according to some implementations.

Some implementations described herein include techniques and arrangements for making recommendations to merchants based on buyer characteristics determined from transaction information. For example, a service provider may provide a payment service to merchants and buyers to enable point of sale (POS) transactions between the merchants and the buyers. As used herein, a transaction may include a financial transaction for the acquisition of goods and/or services (referred to herein as items) that is conducted between a buyer (e.g., a customer) and a merchant, such as at a POS location. For example, when paying for a transaction, the buyer can provide the amount that is due to the merchant using cash, a check, a payment card, or through a buyer application on a buyer device carried by the buyer. The merchant can interact with a POS computing device, i.e., a merchant device, to process the transaction. During the transaction, the merchant device can determine transaction information describing the transaction, such as the amount of payment received from a buyer, the item(s) acquired by the buyer, a time, place and date of the transaction, and so forth. The merchant device can send the transaction information to the service provider.

The service provider may receive transaction information from a plurality of merchants, and may organize the transaction information into merchant profiles and buyer profiles. For example, a single buyer profile may include transaction information for a plurality transactions conducted by the buyer with various different merchants. The transaction information from a plurality of buyer profiles can be analyzed to determine characteristics of buyers that are customers or potential customers of a particular merchant. The service provider may provide personalized recommendations to the particular merchant based on the processing of the transaction information in the buyer profiles. In some cases, the recommendations may be made in near real time and may be directed to events currently taking place at the merchant's POS location, while in other cases, the recommendation may be directed to short-term planning or long-term planning for optimizing and improving the merchant's business.

As an example of a near real time recommendation, suppose that the merchant is an art dealer, and the service provider has determined that a buyer who has entered the merchant's store has purchased a substantial amount of art in the past for substantial sums of money. Accordingly, the service provider may send a recommendation to the merchant to notify the merchant that the buyer who has entered the store has made a number of substantial art purchases in the past, and may recommend that the merchant deal with the buyer directly or assign the merchant's best sales employee to serving the buyer. Additionally, in some examples, the recommendation may include an image of the buyer, the current location of the buyer in the merchant's store, or the like.

As an example of a recommendation directed to short-term or long-term planning for the merchant's business, suppose that analysis of the transaction information indicates that the number of transactions for a particular merchant tends to peak toward the end of the day, but is very low at the beginning of the day, and further that many of these buyers continue to conduct transactions after the merchant has closed. Accordingly, the service provider may send a recommendation to the particular merchant pointing out this finding, and recommending that the merchant open an hour later at the beginning of the day and stay open an hour later at the end of the day, which may substantially increase the amount of business the merchant performs per unit of time spent open.

Implementations of the payment and recommendation service herein may provide various recommendations to a merchant to optimize the merchant's business, increase earnings, expand the business, attract new customers, manage relationships with current customers, and so forth, based on analysis of transaction information received from the merchant and from other merchants. For discussion purposes, some example implementations are described in the environment of a service computing device that makes personalized recommendations to merchants based on analysis of transaction information. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 for a payment and recommendation service according to some implementations. For instance, the environment 100 may enable a service provider to provide recommendations to a merchant to assist the merchant in optimizing the merchant's business. In the illustrated example, one or more service computing devices 102 of the service provider are able to communicate with one or more merchant devices 104 over one or more networks 106. Further, each merchant device 104 may be associated with a respective merchant 108. For example, a plurality of first merchant devices 104(1) may be associated with a first merchant 108(1). Additionally, other merchant devices 104(2)-104(N) may be associated with other merchants 108(2)-108(N).

Each merchant device 104 may include an instance of a merchant application 110 that executes on a respective merchant device 104. The merchant application 110 may provide POS functionality to the merchant device 104 to enable the merchant 108 and/or employees 112 of the merchant to accept payments from buyers 114 at one or more POS locations. In this example, the first merchant 108(1) has two POS locations, illustrated as a first POS location 116 and a second POS location 118. In some types of businesses, a POS location may correspond to a store or other place of business of the merchant, and thus, may be a fixed location that typically does not change on a day-to-day basis. In other types of businesses, however, the POS location may change from time to time, such as in the case that the merchant operates a food truck, is a street vendor, a cab driver, or has an otherwise mobile business, e.g., in the case of merchants who sell items at buyers' homes, buyers' places of business, and so forth.

As used herein, a merchant may include any business or other entity engaged in the offering of goods or services for acquisition by buyers in exchange for compensation received from the buyers. Actions attributed to a merchant herein may include actions performed by employees or other agents of the merchant and, thus, no distinction is made herein between merchants and their employees unless specifically discussed. In addition, as used herein, a buyer may include any entity that acquires goods or services from a merchant, such as by purchasing, renting, leasing, borrowing, licensing, or the like. Buyers may be customers or potential customers of a particular merchant. Hereinafter, goods and/or services offered by merchants may be referred to as items. Thus, a merchant and a buyer may interact with each other to conduct a transaction in which the buyer acquires one or more items from a merchant, and in return, the buyer provides payment to the merchant.

In the example of FIG. 1, transaction information 120 may be sent by the merchant application 110 from the merchant device 104 to the service computing device 102. For example, the transaction information 120 may be sent as each transaction is conducted, may be sent in a batch at a subsequent point in time (e.g., if the merchant is processing transactions off-line), or using other suitable techniques. The transaction information 120 may include information regarding the time, place, and the amount of each respective transaction, information related to the item acquired, a type of payment used (e.g., cash, check, payment card, electronic payment), as well as additional information, such as buyer information. For instance if a payment card is used, the transaction information 120 can include data stored in the payment card, e.g., Track 1 data (cardholder name, card number and other card information), as well as a receipt email address, if provided by the buyer, for receiving a receipt through email. Other examples of transaction information 120 that can be captured include item purchase information, e.g., an itemized listing of the items acquired, the price paid for each item, card mix data, geolocation data indicating a geographic location of a particular transaction, online/offline card data, data describing the merchant, e.g., a merchant identifier, a merchant category code (MCC), any type of data that is received upon a buyer's authentication into a social network, if any, and various other types of information, as discussed additionally below. Thus, the first merchant devices 104(1) may send first transaction information 120(1) to the service computing device 102 for transactions conducted at the first POS location 116 and the second POS location 118.

The service computing device 102 may also receive transaction information 120 from the plurality of other merchants 108. For example, a large number of other merchants 108(2)-108(N) may also operate their own merchant devices 104(2)-104(N), respectively, for conducting transactions with respect to their own businesses. Accordingly, transaction information 120(2)-120(N) from the merchant devices 104(2)-104(N) associated with the other merchants 108(2)-108(N) may also be provided to the service computing device 102.

As discussed additionally below, the service computing device 102 may receive the transaction information 120 and may associate the transaction information 120 with merchant information 122 maintained by the service computing device 102. For example, the first transaction information 120(1) may be associated with a first merchant profile 124(1) corresponding to the first merchant 108(1), the Nth transaction information 120(N) may be associated with an Nth merchant profile 124(N) corresponding to an Nth merchant 108(N), and so forth.

In addition, buyer information 126 may be extracted from the transaction information 120 and may be associated with buyer profiles 128. For example, the transaction information 120 for a particular transaction may include a payment card identifier of the payment card that was used as a payment instrument, and may further include the name of the holder of the payment card that was used. Accordingly, a buyer profile 128 may be associated with an identifier of the payment card and/or the name corresponding to the holder of the payment card. Additional transaction information may be related to this buyer profile, such as the POS location of the transaction, the amount of the transaction, the time and date of the transaction, the item(s) acquired through the transaction, descriptive information about the item(s) acquired, the price paid for each item, and so forth.

The service computing device 102 may include a recommendation module 130 that may analyze the merchant profiles 124 and the buyer profiles 128 for making recommendations 132 to one or more of the merchants 108. The recommendations 132 may refer to near real time events that may be of interest to the merchant and/or may refer to short-term or long-term planning for the merchant's business. In the illustrated example, a first recommendation 134 to the first merchant 108(1) notifies the merchant that a particular buyer 114(1), Jane Doe, one of the merchant's best customers, has checked in to or otherwise been determined to be present at the merchant's first store location, corresponding to the first POS location 116. The first recommendation 134 may further recommend that the merchant greet the particular buyer 114(1), or may recommend another action.

In some cases, as described additionally below, some of the buyers 114 may be carrying buyer devices (not shown in FIG. 1), such as smart phones, tablet computers, wearable computing devices, or the like, as further enumerated elsewhere herein, some of these buyer devices may have installed thereon a buyer application that includes an electronic payment module that enables the buyer to pay using the buyer application, rather than with a physical payment card, cash, check, etc. The buyer application may further enable the buyer to check in at the store or prior to entering the store, such as to place an order for an item. For example, the buyer may be able to place an order through the buyer application, may skip waiting in a line for ordering, may pay for the transaction using the buyer application, and may proceed directly to an area of the store to pick up the ordered item.

The buyer application may further provide a location of the particular buyer 114(1) within the store, such as in proximity to one or more wireless beacons within the store. For example, the store with may be equipped with a plurality of Bluetooth® low energy beacons (not shown in FIG. 1) distributed at various locations throughout the store and that are detectable by the buyer application on the buyer device. Accordingly, the recommendation 134 may further include an identifier of a particular beacon within the store to which the particular buyer is in closest proximity. Additionally or alternatively, the recommendation 134 may include a photograph of the particular buyer 114(1) that the particular buyer 114(1) has previously provided to the service computing device 102 be used in association with the buyer application.

As one example, suppose that the particular buyer 114(1), Jane Doe, has entered the store at the first POS location 116 and has checked in using the buyer application. The service provider may send the recommendation 134 to the merchant device(s) 104(1) at the first POS location 116, and the recommendation 134 may be presented on one or more displays (not shown in FIG. 1) associated with the one or more merchant devices 104(1). For instance, one of the employees 112 may notify the first merchant 108(1) of the content of the recommendation 134, or may act on it himself or herself In some cases, the first merchant 108(1) may be assisted in recognizing the particular buyer 114(1) by a photograph and/or location information included with the recommendation 134, as discussed above. Accordingly, the first merchant 108(1) may greet the particular buyer 114(1) and/or may otherwise provide special service to the particular buyer 114(1) based on the recommendation 134.

As another example, the recommendations 132 may be directed to short-term or long-term planning for the merchant's business. For instance, suppose that the transaction information indicates that the returning or regular buyers for the first POS location 116 tend to come to the first POS location in the morning, while the returning or regular buyers for the second POS location 118 tend to come to that second POS location for lunch and in the afternoon. As a result of this finding, a recommendation 136 to the first merchant 108(1) may be that the merchant herself or himself, or the merchant's best employees, be at the first POS location in the morning and at the second POS location for lunch and in the afternoon so that the regular customers are ensured to receive the best service.

Accordingly, recommendations 132 to the merchant may be made based on analysis of when transactions are conducted, and with whom the transactions are conducted, in light of other information known about the buyers. Thus, numerous types of personalized recommendations may be made to the merchants 108 based on analysis of the buyer profiles 128 and the merchant profiles 124, additional examples of which are discussed below.

Figure 2:
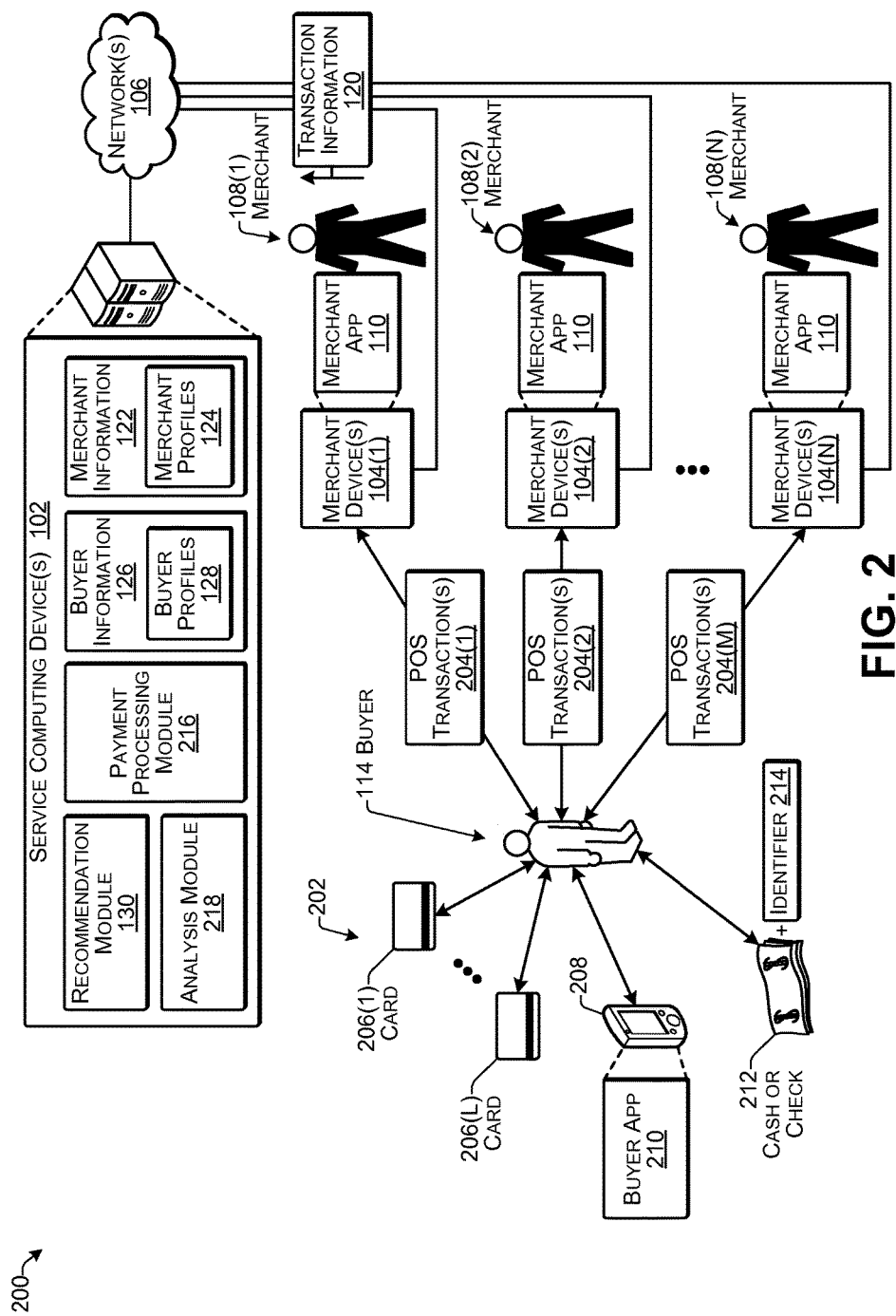
FIG. 2 illustrates an example environment for enabling point of sale transactions between merchants and buyers according to some implementations.

FIG. 2 illustrates an example environment 200 for enabling transactions between merchants and buyers according to some implementations. In this example, a buyer 114 may use any of a variety of different payment instruments 202 when participating in a plurality of POS transactions 204(1)-204(M) with a plurality of different merchants 108(1)-108(N). For example, a buyer may typically have a plurality of payment cards 206(1)-206(L), such as credit cards, debit cards, prepaid cards, and so forth, that the buyer 114 may use for conducting various different POS transactions 204. Further, in some examples, the payment cards 206 may include one or more magnetic strips for providing card and buyer information when swiped in a card reader. In other examples, other types of payment cards 206 may be used, such as smart cards having a built-in memory chip, a radiofrequency identification tag, and so forth.

A buyer 114 may select a particular payment card 206 for use at a particular POS location and/or for use with a particular merchant 108 for any of a variety of different reasons and may often use different payment cards. For example, the buyer 114 may not always use the same payment card 206 with the same merchant 108 for every POS transaction 204 conducted with that merchant 108. In such scenarios, the transaction information that describes transactions that are conducted using a first payment instruments 202 may be separate or disconnected from the transaction information 120 that describes other transactions conducted using a second payment instrument 202. Such disconnected sets of transaction information 120 can make it difficult to capture a holistic view of a buyer's shopping behavior and preferences. Thus, in some examples herein, various techniques may be used for matching transaction information corresponding to multiple different payment instruments to a single buyer profile. This enables creation of a single or more complete buyer profile to describe the shopping behavior of the corresponding particular buyer. Such buyer profiles 128 of respective buyers 114 can be aggregated and the information contained therein evaluated to provide merchants with data describing their customer base, and to provide the merchants with customized or otherwise personalized recommendations and other types of information.

In addition to payment cards, a buyer 114 may carry a buyer device 208, as discussed above. The buyer device 208 may include a buyer application 210, which enables an associated electronic payment account to be used as a payment instrument 202. For example, the buyer application 210 may include an electronic payment module 208 that uses an electronic payment account of the buyer 114 for making electronic payments for transactions. In some cases, the electronic payment account of the buyer 114 may be linked to one of the buyer's payment cards 206, such as a credit card. Accordingly, the buyer application 210 may enable the buyer 114 to pay for a transaction with the linked credit card without having to produce the credit card, thereby enabling a card-less payment to the merchant with the credit card. The buyer application 210 and the corresponding electronic payment account, can be associated with various buyer information including, for example, the buyer's name, information describing the payment card linked to the electronic payment account, and an email address linked to the electronic payment account to which receipts can be sent for electronic payment transactions that are conducted by the buyer 114 using the buyer application 210. Further, as an alternative to linking the electronic payment account to a credit card, the electronic payment account may be a different type of account, such as a checking account, a debit account, a savings account, a prepaid account having a prepaid quantity of money deposited therein, or the like.

In addition to the above discussed payment instruments, the buyer 114 may also optionally pay with a check or cash 212. For example, if the buyer 114 pays with check or cash 212, the merchant may sometimes also receive an identifier 214 that provides additional identification information about the buyer 114. For instance, a merchant may have a club card or other incentive that enables identification of the buyer to the merchant and thereby to the merchant application 110. As an example, the buyer 114 may provide a telephone number associated with the buyer 114, and this telephone number along with other transaction information may be cross-referenced to a matching telephone number in an existing buyer profile 128 to associate the transaction with the existing buyer profile 128. Additionally, or alternatively, the buyer 114 may provide an email address in association with a particular transaction to receive a receipt for the transaction by email, rather than receiving a paper receipt, and the email address may be used to associate the transaction with an existing buyer profile 128. Alternatively, if the buyer 114 pays with a check, the buyer 114 may be required to provide buyer information in association with the check, which, in addition to a checking account number, may include telephone number, address, and other identification information. Accordingly, this information may also be associated with the particular transaction, and may thereby enable the transaction to be associated with an existing buyer profile 128. Furthermore, as discussed additionally below, if an existing buyer profile 128 that matches the transaction information for a new transaction cannot be located, a new buyer profile 128 may be created.

The service computing device 102 may include a payment processing module 216 that may receive at least transaction information 120 for processing payments made through the merchant application 110 and, in some cases, the buyer application 210. For example, the payment processing module 216 may receive transaction information 120, such as an amount of the transaction, and may verify that a particular payment card can be used to pay for the transaction, such as by contacting a card clearinghouse computing device or other bank computing device, as discussed additionally below. Furthermore, in some examples, the payment processing module 216 may redirect payment information for transactions to be made using payment cards 206 to a bank computing device (not shown in FIG. 2), while in other examples, the merchant devices 104 may communicate directly with an appropriate bank computing device for approving or denying a transaction using a particular payment card 206 for a particular transaction. Additional details of payment processing are discussed below.

The service computing device 102 may further include an analysis module 218. For example, the analysis module 218 may receive the transaction information 120 and associate the transaction information 120 with appropriate merchant profiles 124 and appropriate buyer profiles 128. Thus, as discussed additionally below, the analysis module 218 may compare received transaction information 120, which may include an identifier of the merchant device 104 or an identifier of an instance of a merchant application 110 from which the transaction information 120 is received for associating the transaction information 120 with a particular merchant profile 124. Furthermore, the analysis module 218 may extract buyer information such as credit card identifier, buyer name, buyer email address, and various other pieces of buyer information from the transaction information 120, and may match this information with an existing buyer profile 128. If no match is found, then a new buyer profile 128 may be created.

The buyer profiles 128 and/or merchant profiles 124 described herein may be created and maintained using any suitable types of data structures, and using any suitable data storage or database techniques. In some examples, the transaction information and other profile information may be maintained in a relational database in which pieces of information for individual buyer profiles may be stored distinctly from one another, but are related to or otherwise associated with each other in the relational database. For instance, a particular buyer profile 128 may be obtained by generating a view of a portion the data related in the database to the particular buyer profile, or by otherwise extracting the data from the database. Alternatively, of course, other types of storage techniques may be used for generating and maintaining the buyer profiles 128 and/or the merchant profiles 124. Furthermore, as discussed below, in some examples a probabilistic model may be used to determine within a threshold level of confidence that transaction information 120 from a particular transaction should be associated with a particular buyer profile 128.

Figure 3:
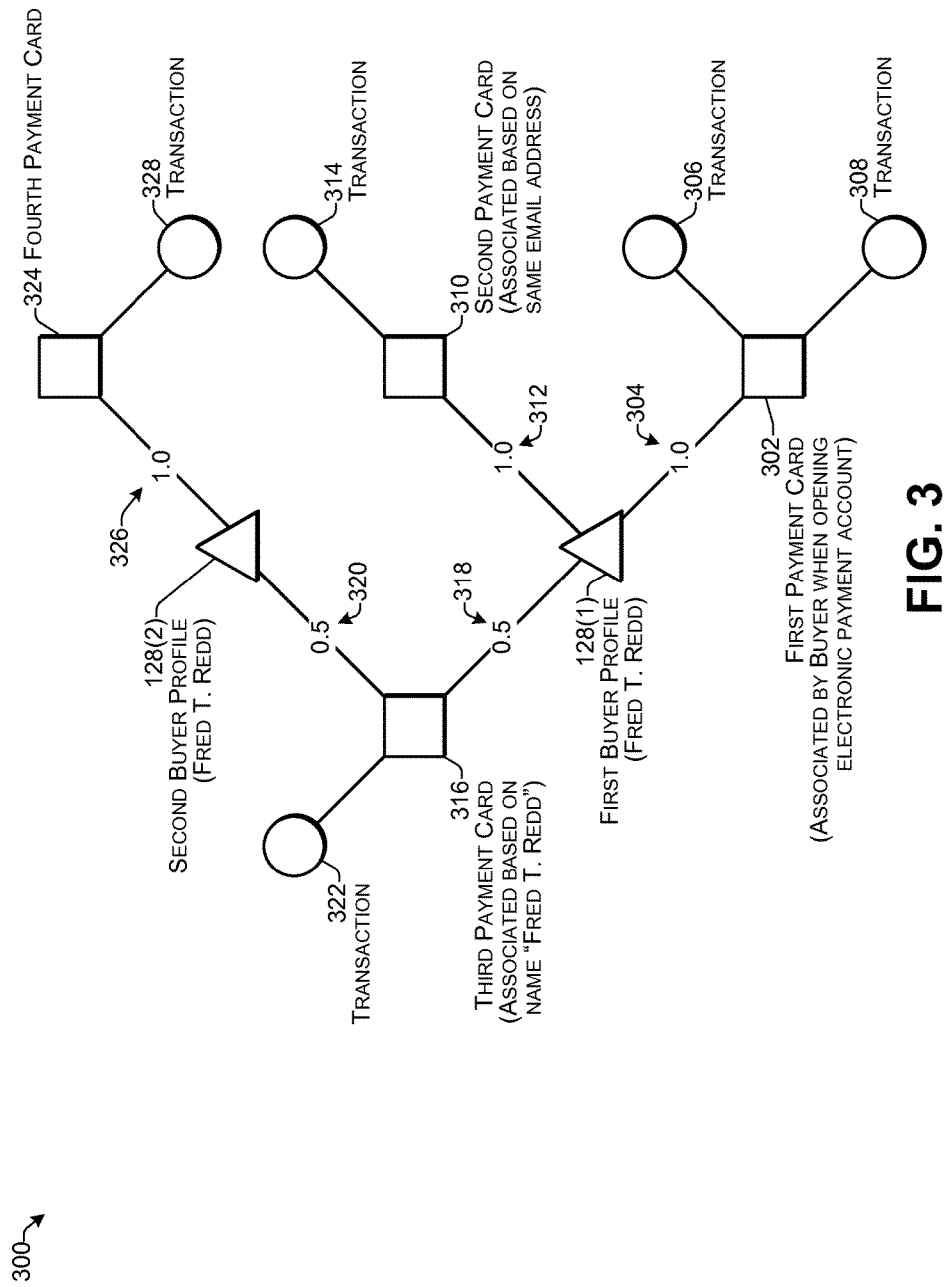
FIG. 3 illustrates an example probabilistic model for associating transactions with buyer profiles according to some implementations.

FIG. 3 illustrates an example probabilistic model 300 for associating transactions with buyer profiles according to some implementations. In this example, the probabilistic model 300 includes a weighted graph in which triangular nodes represent buyer profiles, such as a first buyer profile 128(1) and a second buyer profile 128(2), respectively. The probabilistic model 300 indicates the probabilities that particular transactions are associated with particular buyer profiles, such as based on buyer use of different payment instruments, as discussed above with respect to FIG. 2, and further based on the information included with each transaction and the information already included in each buyer profile 128. The probabilistic model 300 can be used to determine whether to associate a particular transaction with a particular buyer profile, and to determine when to merge buyer profiles 128 and/or to indicate when new buyer profiles should be created. As mentioned above, the buyer profiles 128 may be analyzed and segmented into subsets based on one or more commonalities to provide merchants 108 with recommendations for optimizing their businesses based on buyer behavior.

In the example of FIG. 3, the probabilistic model 300 shows that the triangular node that represents the first buyer profile 128(1) is associated with a square node 302, which represents a first payment card with a 1.0, i.e., 100 percent, confidence score, as indicated at 304. The confidence score 304 indicates that the financial transactions conducted using the first payment card correspond to the first buyer profile 128(1) with a confidence of 100 percent, but, of course, this confidence score may not necessarily authorize a buyer to use the corresponding payment card, as such authorizations are managed separately. Circular nodes 306 and 308 represent respective transactions that were conducted using the first payment card, and are thereby associated with the node 304. Accordingly, the transaction information corresponding to the transactions 306 and 308 can be associated with the first buyer profile 128(1) with a confidence level of 100 percent.

The triangular node that represents the first buyer profile 128(1) is also associated with a square node 306, which represents a second payment card with a 1.0 confidence score. For example, suppose that the first buyer associated a particular email address with the first buyer profile 128(1), such as when signing up for an electronic payment account. Subsequently, suppose that the first buyer used the second payment card for a transaction and requested that a receipt be sent to the same email address as the email address associated with the first buyer profile. Accordingly, based on matching of the email address associated with the second card and the email address previously associated with the first buyer profile 128(1), the second payment card may be associated with the first buyer profile with a 1.0 confidence score, as indicated at 312. This confidence score 312 indicates that transactions, such as a transaction represented by a circular node 314, conducted using the second payment card may be included in the first buyer profile 128(1) with a confidence level of 100 percent.

In addition, the model 300 shows the triangular node 102 that represents the first buyer profile 128(1) and the second triangular node that represents the second buyer profile 128(2) are both associated with a square node 316, which represents a third payment card. For example, suppose that when the transaction information including the third payment card information was received, an identifier associated with the third payment card did not the match card identifiers in any current buyer profiles. Further, suppose that the name associated with the third payment card (Fred T. Redd) is the same as the names associated with two buyer profiles, i.e., the first buyer profile 128(1) and the second buyer profile 128(2). Accordingly, the third card may be associated with the first buyer profile 128(1) and the second buyer profile 128(2) using a 0.5, or 50 percent, level of confidence as the confidence score, as indicated at 318 and 320, respectively. Consequently, the model 300 indicates that there is a 50 percent probability that a transaction represented by a circular node 322 conducted using the third payment card was performed by the first buyer associated with the first buyer profile 128(1) and a 50 percent probability that the transaction was conducted by the second buyer associated with the second buyer profile 128(2).

Accordingly, in some examples, the transaction information for the transaction represented by node 322 may not be associated with either of the first profile 128(1) or the second profile 128(2), since a name is not always a reliable indicator of an individual identity. However, in other examples, other information included with the transaction information may be taken into consideration to change the confidence levels 318, 320. For instance, the second buyer profile 128(2) may have a fourth payment card associated, as indicated by square node 324, with a confidence score of 1.0, as indicated at 326. Accordingly, a transaction corresponding to circular node 328 may be associated with the second buyer profile 128(2) with 100 percent confidence.

As an example, suppose a comparison of the item purchase information from the transaction associated with node 322 with the item purchase information for the transactions associated with nodes 306, 308, 314 and 328 indicates that the transaction associated with node 322 took place at the same merchant POS location and at the same approximate time of day, but on a different date, as the transaction associated with node 308. Further, suppose that the transaction associated with node 328 and associated with the second buyer profile 128(2) took place in a different city from the transactions associated with nodes 306, 308, 314 and 322. Furthermore, suppose that the transaction associated with node 308 is for a medium-sized vanilla latte and a blueberry bagel, and that the transaction associated with node 322 is for a medium-sized vanilla latte and a cinnamon bagel. Accordingly, in some instances, the transaction information for the respective transactions may be used to substantially change the confidence scores 318 and 320, which, if the confidence score exceeds a threshold, results in the transaction information associated with node 322 being associated with the first buyer profile 128(1).

As one example, probabilistic model 300 may include a trained statistical model that accounts for numerous pieces of information included in the transaction information for various types of transactions, such as location of the transaction, type or category of merchant, time of day of the transaction, day of the week, items purchased through the transaction, descriptors of items purchased, amount paid for the transaction, and so forth, in addition to information such as payment card identifier, name associated with the payment card, and any other information, such as email addresses, home or business addresses, phone numbers, etc. The statistical model may be initially trained using a set of training data, checked for accuracy, and then used for matching transactions with particular buyer profiles by determining confidence scores, and associating a particular transaction with a particular buyer profile when a confidence score exceeds a specified threshold of confidence. The statistical model may be periodically updated and re-trained based on new training data to keep the model up to date. Examples of suitable statistical models that may be incorporated into the one or more probabilistic models 134 herein may include regression models, such as linear regression models, and stochastic models, such as Markov models, hidden Markov models, and so forth.

For example, suppose that, based on analysis of the item purchase information for the transactions associated with nodes 306, 308, 314, 322 and 328, the confidence score 318 is greater than 0.8, while the confidence score 320 is correspondingly less than 0.2. As one example, suppose that the threshold for associating transaction information with a buyer profile is 0.8. Then, if the probabilistic model 300 indicates a confidence score that is greater than 0.8, the transaction information associated with the node 322 may be associated with the first buyer profile 128(1). Thus, the buyer profiles 128 may indicate the item purchase activity and payment activity of an associated buyer across multiple payment accounts or other payment instruments.

Accordingly, the analysis module 218 may be configured to harmonize the transaction information that is received from various merchant devices so that orphan or otherwise disconnected sets of transaction information that correspond to different financial payment instruments, e.g., different payment cards or electronic payment accounts, etc., can be matched to or otherwise associated with particular buyer profiles. In some examples, the analysis module 218 is configured to match financial data corresponding to different financial accounts using the one or more probabilistic models of buyer profiles and respective transactions conducted using the different financial payment instruments. In some examples, the analysis module 218 can apply the probabilistic model 300, for example, by utilizing one or more of a weighted graph model, a probabilistic data store and/or a trained statistical model.

To generate and/or apply the probabilistic model 300, the analysis module 218 may be configured to match, either exactly or heuristically, buyer information and/or item purchase information included in the transaction information using one or more common characteristics. Characteristics that can be used to match transactions include a payment instrument number, e.g., a debit card number or credit card number, Track 1 data from the payment card magnetic strip (e.g., a name of the buyer involved in the transaction), an email address linked to the transaction (e.g., a receipt email address) or the name used by an buyer in an email username string, e.g., "fred.redd@example.com," to name a few examples. However, the techniques described herein can be performed using any type of characteristic that can identify a buyer. Further, some characteristics, such as email address, phone number or payment card identifier, may have a higher level of confidence than other characteristics such as buyer name.

Thus, the probabilistic model 300 may represent associations between buyer profiles, respective financial accounts or other payment instruments, and the transactions associated with those accounts or other payment instruments. After finding a match between a buyer profile and transaction information for a particular transaction, the probabilistic model 300 or the analysis module 218 can assign a confidence score that is associated with that match. For example, some types of matches, such as email addresses, payment card identifiers, telephone numbers, and the like, may have such high confidence levels that a confidence score of 100 percent or 1.0 may be assigned if there are no other matching buyer profiles. For heuristic matches, the confidence score is a probability that represents a likelihood that a particular transaction is associated with a particular buyer profile, rather than a different buyer profile. The analysis module 218 can update these probabilities as transaction information describing new transactions is received from the merchant devices.

The analysis module 218 can use the probabilistic model to create or add to buyer profiles to provide a holistic view of a corresponding buyer's shopping behavior and preferences, as compared to other buyers. For example, for a particular buyer, the analysis module 218 can determine based on the buyer's history of transactions (using, for example, the respective itemized listing of purchases associated with those transactions) that the particular buyer is likely to prefer a vegetarian diet because the buyer orders less meat-based items than other similar buyers. This probabilistic data point can then be added to the particular buyer's buyer profile.

Some types of information can be associated with a buyer profile in a probabilistic manner. For example, the buyer's gender and age may be determined within a certain confidence level based on the buyer's name and third-party data, e.g., data from the U.S. Census Bureau, data from a social network site, data from a microblog site, or other online presences of the various different buyers. The buyer's dietary restrictions or habits can be probabilistically determined from the buyer's itemized listings of purchases. For example, if the buyer always orders soy-based coffee, then a probabilistic data point indicating that this buyer is lactose intolerant may be included in the corresponding buyer profile. Geographic locations corresponding to the buyer's home and/or work locations can be probabilistically determined based on the geographic locations of merchants where the buyer conducts transactions. For instance, the analysis module 218 can determine a likely home or work location based on a geographic location at which a transaction was conducted with a taxi and the corresponding amount charged by the taxi. The analysis module 218 can determine a radius beginning from the drop-off geographic location and based on how far the taxi could travel for the amount that was charged. Similarly, the analysis module 218 can add probabilistic data points referencing the buyer's commutes to certain geographic locations. For example, the analysis module 218 can probabilistically determine the buyer's commutes to certain geographic locations based on purchases made while on a predictable path the buyer follows on certain days and at certain times.

Various hobbies and other activities can also be probabilistically associated with the buyer profile of a particular buyer. For example, the analysis module 218 can evaluate the types of merchants at which the buyer conducts transactions. The categories of these merchants can be determined, for example, using the merchants' self-declared business category or using merchant category codes (MCC). The MCC is a four-digit number assigned to a business by credit card companies (e.g., American Express®, MasterCard®, VISA®) when the business first starts accepting payment cards as a form of payment. The MCC is used to classify the business by the type of goods or services provided by the business. Accordingly, if the buyer is regularly shopping at a particular category of merchant, e.g., a bike shop, then the buyer can be probabilistically identified as a cyclist. For example, if the buyer purchases bike lights from a bike shop and returns to the bike shop the following week to purchase a spare tire, then a probabilistic data point indicating that the buyer is a cyclist might be added to the buyer's buyer profile.

As another example, the buyer's preferences for certain types of clothing, shoes, sizes, and colors can also be determined from the item information associated with the buyer's transactions. For example, if the buyer purchases red medium-sized shirts, then probabilistic data points indicating that the buyer prefers the color red, red shirts, and medium-sized shirts, can be added to the corresponding buyer profile. As described below, buyer profiles for multiple buyers can be aggregated in various ways to provide recommendations and/or other information to merchants based on buyer characteristics.

Figure 4:
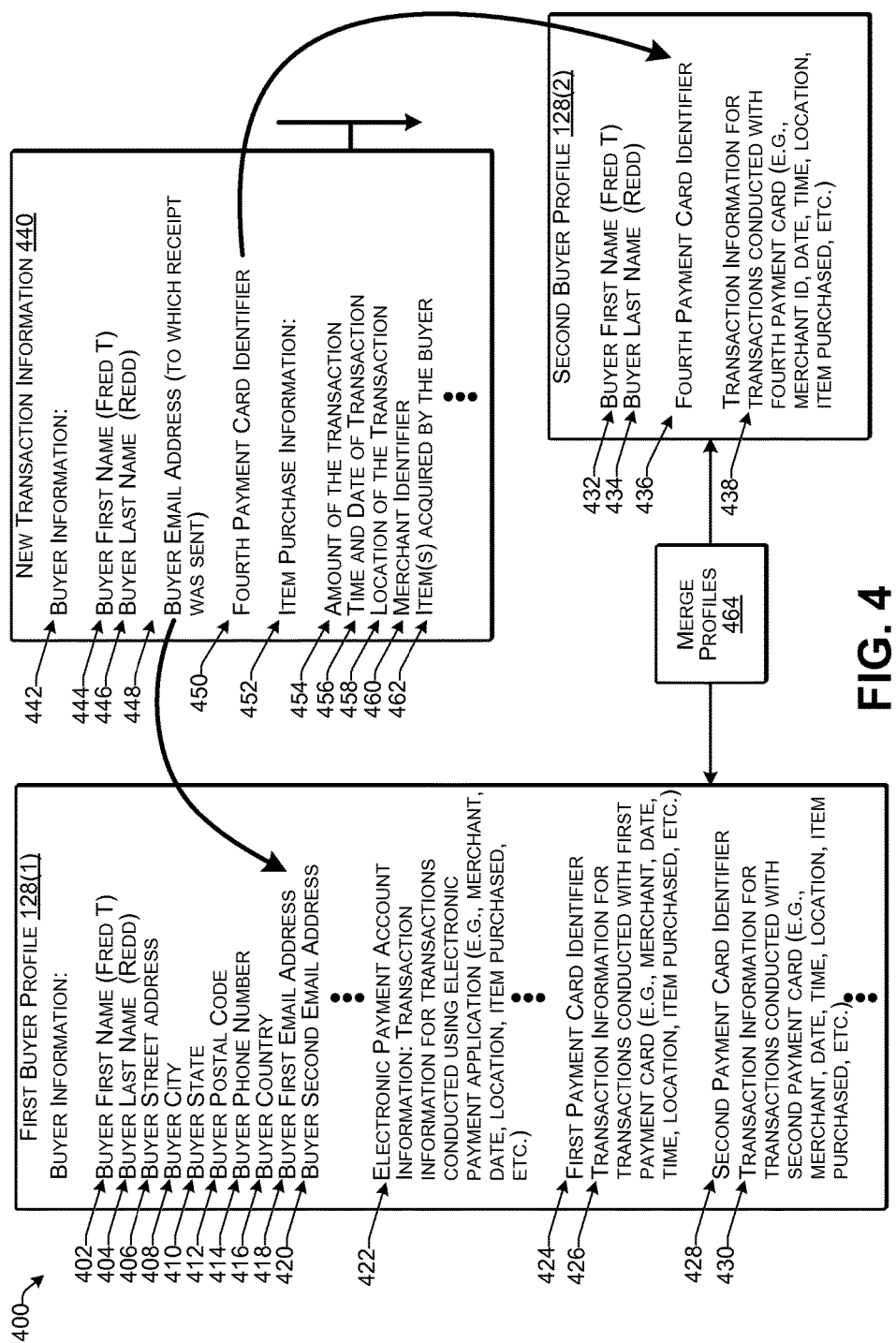
FIG. 4 is a block diagram illustrating an example of merging buyer profiles based on transaction information according to some implementations.

FIG. 4 illustrates an example conceptual diagram 400 of merging buyer profiles based on newly received transaction information according to some implementations. In this example, as discussed above with respect to FIG. 3, the first buyer profile 128(1) and the second buyer profile 128(2) are considered to be separate buyer profiles because the only connection is that the same name (Fred T. Redd) is associated with both buyer profiles, which, taken alone, typically may not provide sufficient confidence for merging two profiles. This example, illustrates a portion of the information that may be included in the first buyer profile 128(1), including buyer first name 402, buyer last name 404, buyer street address 406, buyer city 408, buyer state 410, buyer postal code 412, buyer phone number 414, buyer country 416, buyer first email address 418, buyer second email address 420, and so forth, depending on the information obtain from the buyer and/or obtained over time through transactions conducted by the buyer. The first buyer profile 128(1) may further include electronic payment account information 422, which may include transaction information for transactions conducted using the electronic payment account associated with the first buyer profile 128(1).

In addition, the first buyer profile 128(1) may further include an identifier 424 for a first payment card associated with the first buyer profile 128(1) and transaction information 426 for transactions conducted using the first payment card. As one example, rather than storing an actual credit card number in association with a buyer profile, a one-way hash function may be used to generate a card identifier, or various other encryption techniques may be used to protect the security of the actual card information. Further, individual payment cards may be individually distinguished by the information on the card. For example, a single credit card number may be shared between spouses or other family members, but each card may have additional information to distinguish one card from the other, and thereby distinguish a transaction conducted by a first family member from a transaction conducted by a second family member. In addition, the first buyer profile 128(1) may further include a payment card identifier 428 for a second payment card associated with the first buyer profile 128(1) and transaction information 430 for transactions conducted using the second payment card.

In this example, and as a continuation of the example of FIG. 3 discussed above, the second buyer profile 128(2) includes substantially less information than the first buyer profile 128(2). For instance, the second buyer profile 128(2) merely includes the buyer first name 432, buyer last name 434, a fourth payment card identifier 436, and transaction information 438 for transactions conducted using the fourth payment card.

Suppose that the service computing device has received new transaction information 440, which includes buyer information 442, such as the buyer first name 444, buyer last name 446, a buyer email address 448 to which a receipt was sent, the fourth payment card identifier 450, and item purchase information 452 for the new transaction 440 conducted using the fourth payment card. For example, the item purchase information 452 may include a total amount of the transaction 454, a time and date of the transaction 456, a location 458 of the transaction, such as a geolocation, street address, etc., a merchant identifier 460 of a merchant that participated in the transaction, identification of item(s) 462 acquired by the buyer through the transaction, and may further include various other information related to the transaction (not shown), such as the price paid for each item, any descriptors associated with each item, such as color of the item, size of the item, flavor of item, and so forth.

Furthermore, suppose that the analysis module determines that the email address 448 matches the buyer first email address 418 in the first buyer profile 128(1) and that the fourth payment card identifier 450 matches the fourth payment card identifier 436 associated with the second buyer profile 128(2). Consequently, as an email address and a payment card may typically be considered identifiers of a high level of confidence, then in some examples herein, the second buyer profile 128(2) may be merged with the first buyer profile 128(1), as indicated at 464. For example, to perform the profile merging 464, the information in the second buyer profile 128(2), such as the fourth payment card identifier 436 and the transaction information 438 may be related to or otherwise associated with the first buyer profile 128(1), and the second buyer profile 128(2) may be deleted, marked for deletion, marked inactive, or the like.

Figure 5:
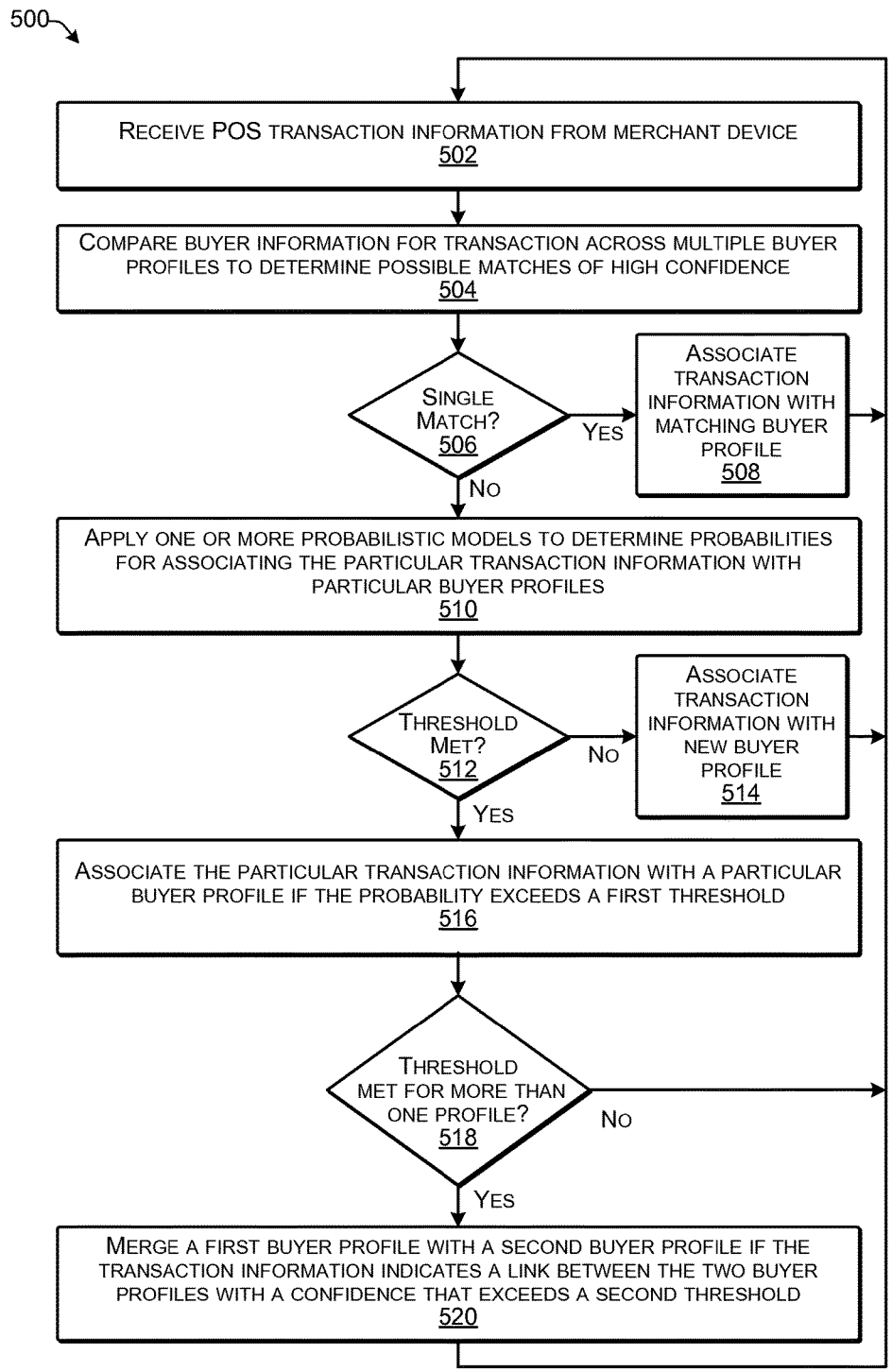
FIG. 5 is a flow diagram illustrating an example process for associating transactions with buyer profiles according to some implementations.

FIG. 5 is a flow diagram 500 illustrating an example process for associating transactions with buyer profiles according to some implementations. The process of FIG. 5 and the processes of FIGS. 8 and 9 below are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. Accordingly, in some implementations, the example process 500 of FIG. 5 may be executed by one or more processors of the service computing device 102 of the service provider.

At 502, the one or more computing devices may receive POS transaction information from a merchant device associated with a merchant. For example, as discussed above with respect to FIGS. 1 and 2, a plurality of the merchant devices associated with a plurality of different merchants may send transaction information for a plurality of transactions to the service computing device 102. Each instance of transaction information may include various amounts of buyer information and item purchase information, such as discussed above with respect to FIGS. 3 and 4.

At 504, the one or more computing devices may compare the transaction information across multiple buyer profiles to determine possible matches with existing buyer profiles. For example, as discussed above with respect to FIGS. 3 and 4, buyer information from the transaction information may be compared with buyer information associated with existing buyer profiles.

At 506, the one or more computing devices may determine whether there is a match of high confidence with a single buyer profile, such as through matching payment card identifiers, email addresses, telephone numbers, payment account identifiers, a merchant incentive program identifier, or other identifiers of high confidence. For example, the confidence of a match for these types of identifiers may be sufficiently high that additional comparisons may not be required. However, in other examples, additional comparison may be performed as discussed below, such as to guard against the possibility that an incorrect phone number or email address was entered, fraudulent use of payment cards, and so forth.

At 508, when there is a match of high confidence with a single particular buyer profile, the one or more computing devices may relate or otherwise associate the transaction information to the matching buyer profile. For example, in the case of a relational database, the transaction information may be related in the database to the buyer profile. In other types of storage systems, the transaction information may be stored with a buyer profile, or may be otherwise associated with the buyer profile using any suitable techniques.

At 510, when there is not a high confidence match with a particular buyer profile, the one or more computing devices may apply one or more probabilistic models to determine probabilities, such as confidence scores, for relating the particular transaction information with particular buyer profiles. For instance, as discussed above with respect to FIGS. 3 and 4, the one or more probabilistic models may include one or more trained statistical models that take into consideration numerous different aspects of the item purchase information such as time, date, place, merchant, items purchased, information about items purchased, and so forth, as well as the buyer information associated with the transaction, as discussed above.

At 512, the one or more computing devices may determine whether a threshold level of confidence is met for associating the transaction information with any of the existing buyer profiles.

At 514, if the threshold level of confidence is not met for any of the existing buyer profiles, the one or more computing devices may associate the transaction information with a new buyer profile. For example, the buyer information included with the transaction information may be used to generate a new buyer profile and the transaction information may be associated with the new buyer profile.

At block 516, if the threshold level of confidence is met for at least one buyer profile, the transaction information may be associated with that buyer profile.

At block 518, the one or more computing devices may determine whether a threshold level of confidence is met for more than one profile. For example, as discussed above with respect to FIG. 4, the transaction information may include a first piece of buyer information, such as a payment card identifier, that can associate the transaction information with a high-level confidence to a first buyer profile, and may also include another piece of buyer information such as an email address, phone number, or the like, that can associate the transaction information with a second buyer profile.

At block 520, if the transaction information can be associated with multiple buyer profiles with a high-level of confidence that exceeds a second threshold, the first buyer profile and the second buyer profile may be merged together as discussed above with respect to FIG. 4. In some examples, the second threshold level of confidence may be different from the first threshold level of confidence. Further, other information included in the multiple buyer profiles may be examined to determine that there is not a conflict to the decision to merge the multiple buyer profiles. The process may subsequently begin processing the next transaction received from the merchant devices.

Figure 6:
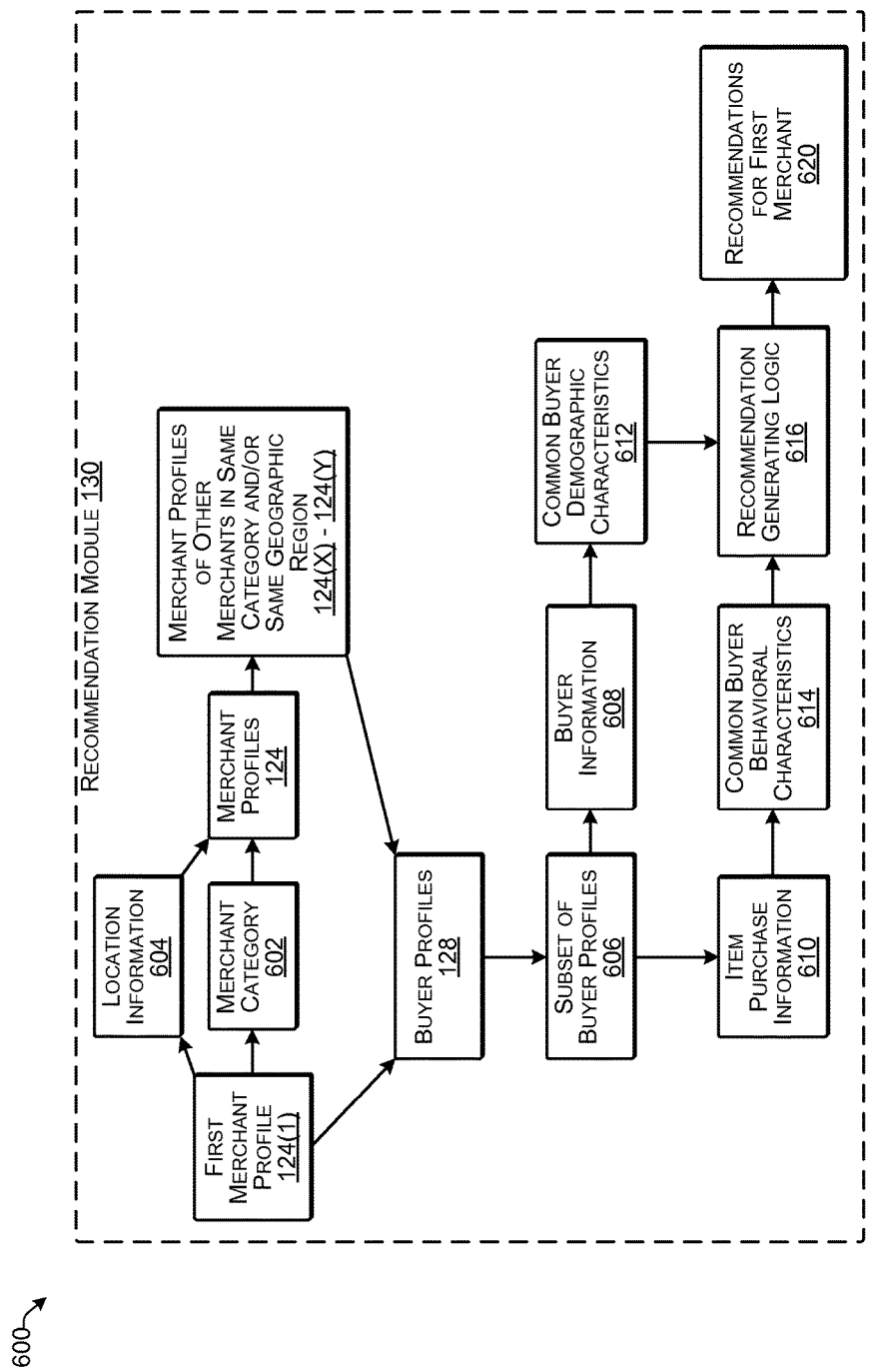
FIG. 6 is a block diagram illustrating an example of determining recommendations for merchants according to some implementations.

FIG. 6 is a conceptual diagram 600 illustrating an example of determining recommendations for merchants according to some implementations. For example, as mentioned above, the recommendation module 130 can aggregate and segment the buyer profiles to identify subsets, e.g., groups of buyer profiles that share certain characteristics. As one example, subsets can be determined using generally known clustering techniques to group a plurality of buyer profiles in such a way that buyer profiles that share certain characteristics are more similar to each other than other buyer profiles. For example, the recommendation module 130 can create subsets of buyer profiles based on various behavioral characteristics or demographic characteristics including, for example, geographic locations wherein the buyers shop, the categories of merchants at which the respective buyers shop, the items purchased by the buyers, the time of day the buyers shop, the average amount spent by the buyers in certain merchant categories, and so forth.

In the example of FIG. 6, suppose that the recommendation module 130 is going to generate one or more recommendations for a first merchant associated with a first merchant profile 124(1). The recommendation module 130 may access the first merchant profile 124(1) to determine information relevant to the first merchant such as a merchant category 602, merchant location information 604, or various other types of merchant information (not shown in this example), such as items offered for sale, hours of operation, and so forth. For instance the MCC for a merchant or other classification techniques may be used to categorize similar types of merchants into merchant categories. In some examples, the merchant categories used herein do not match the MCC categories, but may be more inclusive or less inclusive categories. Similarly, the merchants (and buyers) may be classified into location categories, such as for particular categories of geographic regions, e.g., same street, same neighborhood, same postal code, same district of a city, same city, and so forth. The location categories may be determined based on the location(s) at which the respective merchant conducts POS transactions, such as may be determined from GPS information, the address of the merchant, network access points, cell towers, and so forth. For instance, a merchant may be categorized into several different location categories, such as a particular street, particular neighborhood, particular district, particular city, etc. In addition, the location categories need not all necessarily relate to the same geographic region. For example, an airport bar in San Francisco and an airport bar in Washington D.C. might be associated with the same location category, i.e., being located in an airport. Thus, the location categories may include categories for defined physical areas, such as airports, malls, stadiums, farmer's markets, and so forth. Alternatively, of course, other location-based techniques may be used for determining merchants and/or buyers in the same geographic region or within proximity to one another, etc., such as radial distance from a reference location, or the like.

For purposes of this example, suppose that the recommendation module 130 selects merchant category 602 and location information 604, and applies these selections to the merchant profiles 124 to identify other merchant profiles 124(X)-124(Y) for merchants in the same merchant category and same geographic region as the first merchant. The recommendation module may then cross-reference the merchant profiles 124(1) and 124(X)-124(Y) with the buyer profiles 128 to identify a subset of buyer profiles 606. As one example, the subset of buyer profiles 606 may be buyer profiles containing at least one transaction with the least one of the merchants corresponding to the merchant profiles 124(1) and 124(X)-124(Y). As another example, the subset of buyer profile 606 may be buyer profiles containing at least one transaction with at least one of the merchants corresponding to the merchant profiles 124(X)-124(Y), and with no transactions corresponding to the first merchant profile 124(1). Other variations may also be used in other examples.

The recommendation module 130 may further cluster the information in the subset of buyer profiles 606 such as based on buyer information 608 and/or item purchase information 610, as discussed above, to determine significant characteristics shared in common by some or all of the buyer profiles in the subset 606. Accordingly, the recommendation module 130 may determine common buyer demographic characteristics 612 from the buyer information 608 and/or common buyer behavioral characteristics 614 from the item purchase information 610 that occur with a substantially greater frequency among the subset 606 of buyer profiles than in the buyer profiles 128 in general. For instance, the frequency of occurrence of the common characteristic among at least some of the buyer profiles in the subset 606 may be greater than a frequency of occurrence of the characteristic among the plurality of buyer profiles 128 by a threshold amount, such as by a threshold percentage, or the like. As one example, a common characteristic that might be useful for a recommendation would be if a majority of the buyers in the subset 606 shop during particular hours of the day, while only a minority of a general population of buyers shop during those hours.

The buyer information 608 may include demographic information about the buyer, such as: buyer residence information; buyer age; buyer sex; buyer affluence; buyer ethnicity; buyer language; buyer education; buyer marital status; buyer occupation; buyer religion; buyer political affiliation; buyer memberships in associations, and so forth. As an example, the recommendation module 130 may determine that a common buyer demographic characteristic 612 based on the buyer information 608 is that a large percentage of the buyers corresponding to the subset 606 live in a particular geographic region, e.g., the same neighborhood.

Further, the item purchase information 610 may include information from particular transactions, such as geographic locations at which the buyers shop, the categories of merchants at which the buyers shop, the types of items acquired, times of day at which items were acquired, categories of merchants from which items were acquired, items that were acquired together, items that were acquired within a threshold time of each other, descriptors related to the items acquired, prices paid for the items acquired, amounts spent in certain merchant categories, and so forth. Accordingly, the recommendation module 130 may determine common buyer behavioral characteristics 614 from the item purchase information 610, such as that a large percentage of the subset often buy items from a particular different category of merchant, shop for items offered by the first merchant during hours after the first merchant is closed, often buy two different types of items together, and so forth.

The common buyer characteristics 612 and 614 may be provided to a recommendation generating logic 616, which may generate recommendations 620 that are personalized for the first merchant. For example, the recommendation generating logic 616 may be one or more algorithms, computational models, or the like, configured to select particular ones of the common buyer characteristics 612 and 614 for generating the one or more recommendations 620. For example, based at least in part on a determination of where a large number of the buyers in the subset live, the recommendation generating logic may recommend that the merchant open a place of business near to where the buyers live. As another example, based at least in part on determining that the buyers from the subset 606 often purchase an first item not offered by the first merchant with a second item that is offered by the first merchant, the recommendation generating logic may generate a recommendation 620 that the first merchant start stocking the first item. Accordingly, the recommendation generating logic may include a plurality of decision-making rules that may be applied to generate the recommendations where one or more particular decision-making rules may be invoked in response to a presence of one or more particular category of common buyer characteristics 612 or 614 among at least some of buyer profiles in the subset 606.

In the example illustrated in FIG. 6, the recommendation module 130 can provide recommendations to merchants for optimizing their businesses based on the buyer behavior reflected by the subsets 606 of buyer profiles that are relevant to those merchants. As one example, the recommendation module 130 can identify a particular subset of buyer profiles in which the buyers frequently conduct transactions with various merchant restaurants in a particular geographic region between the hours of 6:00 pm and 10:00 pm. The recommendation module 130 can determine, in the aggregate, the various buyer characteristics 612 and 614 that are associated with the particular subset 606 of buyer profiles. These characteristics describing the particular subset can then be used to provide recommendations 620 to one or more merchant restaurants, since the buyer behavior exhibited in some merchant restaurants may generally also apply to other merchant restaurants.

As one example, the recommendation module 130 can determine what percent of buyers in a subset of buyer profiles are vegetarians. Similarly, the recommendation module 130 can determine what percentage of buyers in the subset dines at merchant restaurants after 9:00 pm. Further, the recommendation module 130 can determine what percentage of buyers in the subset dines frequently at particular geographic regions, e.g., 34 percent dine frequently in the Mission district while 15 percent dine frequently in the Nob Hill district. These types of characteristics can be used to provide relevant merchants with recommendations for improving their businesses. For example, the recommendation module 130 can provide merchant restaurants that close by 9:00 pm with a personalized recommendation to stay open longer because, for example, 22 percent of their buyers dine at restaurants after 9:00 pm.

An another example, the recommendation module 130 can identify a particular subset of buyer profiles 606 corresponding to buyers that frequently conduct transactions with various merchant clothing stores. The recommendation module 130 can determine various characteristics that describe the particular subset 606. For example, the recommendation module 130 can determine a percentage of buyers in the subset that prefer clothing in a certain size, color, or style. This information can be used to provide merchants with recommendations for optimizing their inventory based on the preferred sizes, colors, styles, etc. For example, a merchant recommendation may be to stock more shirts in a medium size because 42 percent of the merchant's buyers purchase that size.

As another example, the recommendation module 130 may be configured to identify buyers that are social influencers. Once identified, relevant merchants can be made aware of certain social influencers, for example, when those social influencers check-in at the merchant. These merchants can then provide social influencers with various incentives, promotions, or the like. For instance, the recommendation module 130 can identify social influencers by clustering transactions that were conducted by buyers at particular merchants within some threshold window of time, e.g., two minutes. For example, using transaction data from the probabilistic model, the recommendation module 130 can determine that a first buyer and a second buyer purchased coffee at or around the same time at a merchant "Coffee Café." When this occurs, the first buyer and the second buyer each have a respective influencer score that is incremented. Based on a different transaction, the recommendation module 130 may determine that the first buyer was at the merchant "Coffee Café" on a different day with a third buyer, and that they each purchased donuts at or around the same time. In response, the respective influencer scores for the first buyer and the third buyer are incremented.

Over time, merchants can be notified when buyers having threshold influencer scores are at the merchant's location. These merchants can then offer influencers special promotions or discount. For example, a merchant may offer an influencer a discount of 20 percent if the influencer is able to get five other buyers to conduct transactions with the merchant. In some instances, a buyer may be a social influencer when it comes to taking other buyers to restaurants while less so when it comes to taking other buyers to retail stores. Thus, in some embodiments, a buyer can have different influencer scores depending on the type of merchant. For example, the buyer can have one influencer score associated with merchant restaurants and a different influencer score for merchant retail stores.

In some examples, the recommendation module 130 may identify certain buyers that are local to a merchant. Merchants can be notified when a particular buyer is local to them, for example, when the buyer checks-in to the merchant or conducts a transaction with the merchant (e.g., upon swiping the buyer's payment card). For instance, the buyer may live or may conduct transactions in the same neighborhood as the merchant's business, the same area or district of a city, the same city, and so forth, and based on a threshold distance for establishing the buyer to be local to the merchant. The recommendation module 130 can identify geographic regions in which a particular buyer frequently conducts transactions with merchants by evaluating transaction information associated with the buyer profile of the buyer. Each transaction with a merchant typically includes location data describing the merchant's street address or Global Positioning System (GPS) data of a location at which the transaction occurred.

The location data can be used to identify concentrations of transactions at locations at which the particular buyer frequently conducts transactions, for example, by clustering the location data associated with these transactions. In some cases, the recommendation module 130 can also identify a region surrounding an identified geographic region based on a threshold radius. For instance, the recommendation module 130 can determine geographic regions in which the particular buyer frequently conducts transactions with merchants.

Once the particular buyer has been identified as a local for a particular geographic region, a merchant that is located in the particular geographic region can be notified, for example, through the merchant device, the next time that particular buyer checks-in or conducts a transaction with the merchant. The merchant can then decide whether to provide the buyer with special treatment, promotions, enrollment in a loyalty program, discounts, etc. The merchant can also be provided with information that describes characteristics of the particular buyer including, for example, the particular buyer's spending habits, whether the buyer is offer sensitive or price sensitive, the buyer's dietary preferences, clothing or shoe size preferences, etc. For example, based on past transactions conducted by the particular buyer, the recommendation module 130 can notify the merchant whether the particular buyer does or does not tip well.

Additionally, in some examples, a merchant can be provided with a list of buyers that are local to the merchant. The merchant can then provide these buyers with various deals or advertisements, or request that the service computing device of the service provider send a message to these buyers on behalf of the merchant, such as offering a coupon or other incentive. In some cases, merchants may pay the service provider for a service that allows the merchant to reach out to buyers that are local to the merchant, for example, through email addresses that the service provider may have associated with respective buyer profiles in the subset of local buyers. For example, the merchant may request that buyers who have only come in once or less over the past several months be sent a promotion to encourage the buyers to come in to the merchant's place of business.

Buyers can sometimes change home or work locations. To ensure that a buyer is still local to a particular geographic region, in some examples, association of geographic regions with particular buyer profiles can be refined based on how recently the particular buyer conducted transactions in respective geographic regions. For example, transactions that occurred over six months earlier might be discarded when identifying geographic regions in which a particular buyer frequently conducts transactions. In some situations, the locality of a buyer can vary depending on the type of merchant. For example, a stricter threshold of locality can be used when identifying a buyer as being local to a coffee shop versus when identifying the buyer as being local to a tailor or kite specialty retailer. Furthermore, in some examples, one or more predictive analytical models can be trained to predict on-the-fly whether a buyer that has checked-in to a merchant or is currently conducting a transaction with the merchant is a local buyer. Furthermore, while the example of FIG. 6 started by determining the subset of buyer profiles based on transactions with the first merchant and/or other merchants in the same category as a first merchant, in other examples, the recommendation module may determine the subset of buyer profiles based on other considerations such as by starting with a common location for conducting transactions, a common item, a common demographic of the buyers, or the like.

Figure 7:
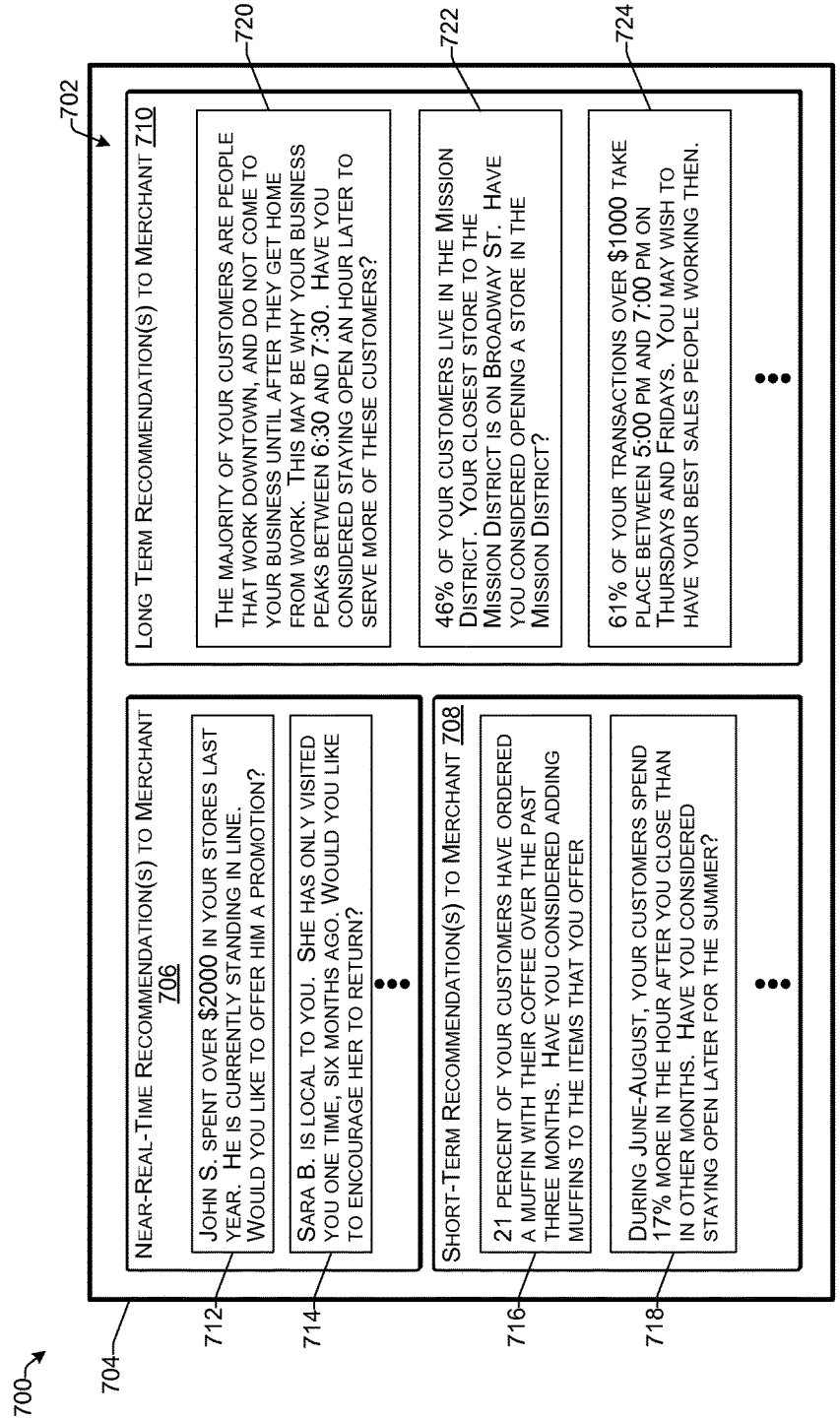
FIG. 7 illustrates an example interface for presenting recommendations to a merchant according to some implementations.

FIG. 7 illustrates an example graphical interface 700 for presenting recommendations to a merchant according to some implementations. For example, one or more recommendations 702 may be presented on a display 704 associated with a merchant device or may be presented to the merchant using any other suitable communication technology. As described above, the recommendation module 130 can evaluate buyer behavior for various different subsets of buyer profiles to provide merchants with personalized recommendations for improving their businesses, such as based on information about buyers who have conducted transactions with the merchants in the past, or information about buyers who potentially may conduct transactions with the merchants in the future.

In the illustrated example, the graphical interface 700 presents the various recommendations 702 that apply to the particular merchant. In this example, the recommendations are separated into three basic types, i.e., near-real-time recommendations 706 for managing relationships with customers currently at the POS; shorter-term recommendations 708 for short-term planning, i.e., managing the business over the next few months; and longer-term recommendations 710 for long-term planning for managing the business further out than the short-term. In some cases, the near-real-time recommendations 706 may pop up or otherwise be presented on the display 704 as they are received, while the shorter-term recommendations 708 and the longer-term recommendations 710 may be viewed by a merchant at a later time, such as by accessing a dashboard, selecting a recommendation notification icon, or the like.

The near-real-time recommendations 706 may be generated based on a current condition that may affect the merchant or the merchant's customers, such as that a particular customer has checked-in at one of the merchant's locations, has entered a store, is currently conducting a transaction with the merchant, and so forth. Examples of near-real-time recommendations include recommendations 712 and 714. For instance, with respect to recommendation 712, the recommendation module on the service computing device may receive a notification, e.g., from the buyer device of John S., that the buyer, John S., has checked-in to the merchant's store. The recommendation module 130 may further determine that John S. spent over $2000 at the merchant's stores in the past year, which may be a substantial amount more than most regular customers of the merchant. Consequently, the recommendation module may generate the recommendation 712 and send a communication including the recommendation 712 to the merchant device, to notify the merchant that John S., has checked in and recommending special treatment for John S.

As another example, suppose that buyer Sara B. is buying an item and offers her payment card to the merchant. The merchant swipes the card, and from the transaction information, the recommendation module determines that Sara B. has only been to the merchant's store once before, six months ago, and further that Sara B. is local to the merchant. Accordingly, the recommendation module may send a recommendation to the merchant, informing the merchant of this finding, and recommending that the merchant provide her with an incentive to return more often.

The shorter-term recommendations 708 may be directed to planning in the short-term, such as for items carried by the merchant, seasonal hours kept by the merchant and so forth. In one example, a short term recommendation 716 may include that 21 percent of the merchant's customers have ordered a muffin with their coffee over the past three months, with a recommendation that the merchant add muffins to the items that offered by the merchant. As another example, a short term recommendation 718 may point out that during June-August, the merchant's customers spend 17% more money in the hour after the merchant closes than in other months of the year, and may include a recommendation that the merchant stay open later during these months.

The longer-term recommendations may be directed long-term planning such as more permanent expanding the business, opening new stores, hiring employees, staffing the business, changing hours of operation, and so forth. For instance, a recommendation can be based on the geographic locations in which the merchant's buyers are often conducting transactions. As one example, a recommendation 720 points out that a majority of a merchant's customers are people that work downtown, and do not come to the merchant's business until after they get home from work, which may be why the merchant's business peaks between 6:30 and 7:30 pm. Thus, the recommendation 720 may recommend that the merchant considered staying open an hour later to serve more of these customers. As another example, the recommendation 722 asks the merchant if the merchant has considered expanding the merchant's business to a geographic region in which a large number of their current customers already live. As still another example, the recommendation 724 may indicate that 61% of the merchant's transactions for over $1000 take place between 5:00 pm and 7:00 pm on Thursdays and Fridays, and may recommend that the merchant have her or his best sales people working during that time.

Figure 8:
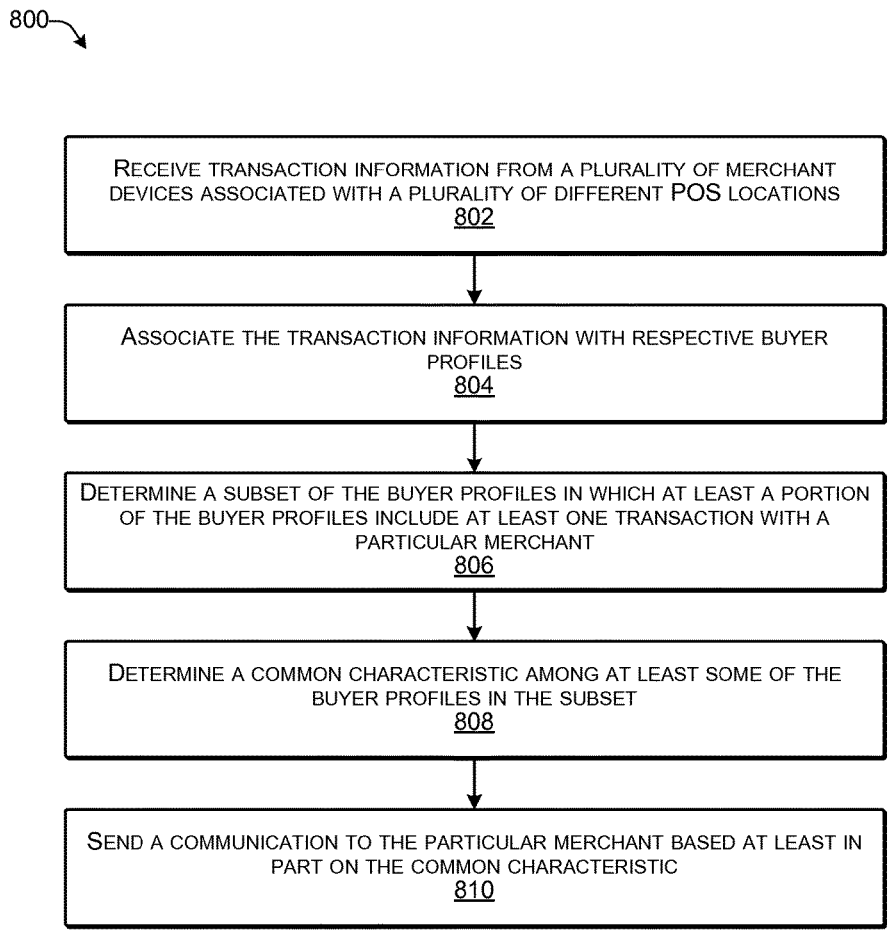
FIG. 8 is a flow diagram illustrating an example process for providing recommendations to merchants according to some implementations.

FIG. 8 is a flow diagram illustrating an example process 800 for providing recommendations to merchants according to some implementations. In some examples, the process may be executed by the one or more service computing devices 102, or by other suitable computing devices.

At 802, the one or more computing devices receive transaction information from a plurality of merchant devices associated with a plurality of different point of service locations. For example, as discussed above, the service provider may receive transaction information from a plurality of different merchant devices associated with a plurality of different merchants for transactions conducted between buyers and those merchants.

At 804, the one or more computing devices may associate the transaction information with respective buyer profiles. For example, as discussed above with respect to FIGS. 3-5, a probabilistic model or other suitable techniques may be used for associating the transaction information with respective buyer profiles.

At 806, the one or more computing devices may determine a subset of the buyer profiles in which at least a portion of the buyer profiles include at least one transaction with a particular merchant. Additionally or alternatively, the subset may be established based on one or more other aspects, such as a geographic region associated with a merchant, items offered by a merchant, hours of operation of the merchant, and so forth.

At 808, the one or more computing devices may determine a common characteristic among at least some of the buyer profiles in the subset of buyer profiles. For example, the common characteristic may be determined based on buyer information such as residence location, age, sex, affluence, ethnicity, language, education, marital status, occupation, religion, political affiliation, or association memberships. Additionally or alternatively, the common characteristic may be determined based on item purchased information such as a type of item acquired, a time at which an item was acquired, a merchant from which an item was acquired, items that were acquired together, items that were acquired within a threshold time of each other, a descriptor about an item acquired, or price paid for an item. Furthermore, when determining the common characteristic, the common characteristic may be selected at least in part based on the characteristic occurring among at least some of the buyer profiles in the subset with a frequency of occurrence that is greater, by a threshold amount, than a frequency of occurrence of the characteristic among the plurality of buyer profiles.

At 810, the one or more computing devices may send a communication to the particular merchant based at least in part on the common characteristic. For example, the communication may include a recommendation related to at least one of hours of operation of the particular merchant, a geographic region for expanding the business of the particular merchant, or an item not currently offered by the particular merchant. Additionally, or alternatively, the recommendation may be related to a particular buyer determined to be within a threshold distance of the particular merchant device associated with the particular merchant.

Figure 9:
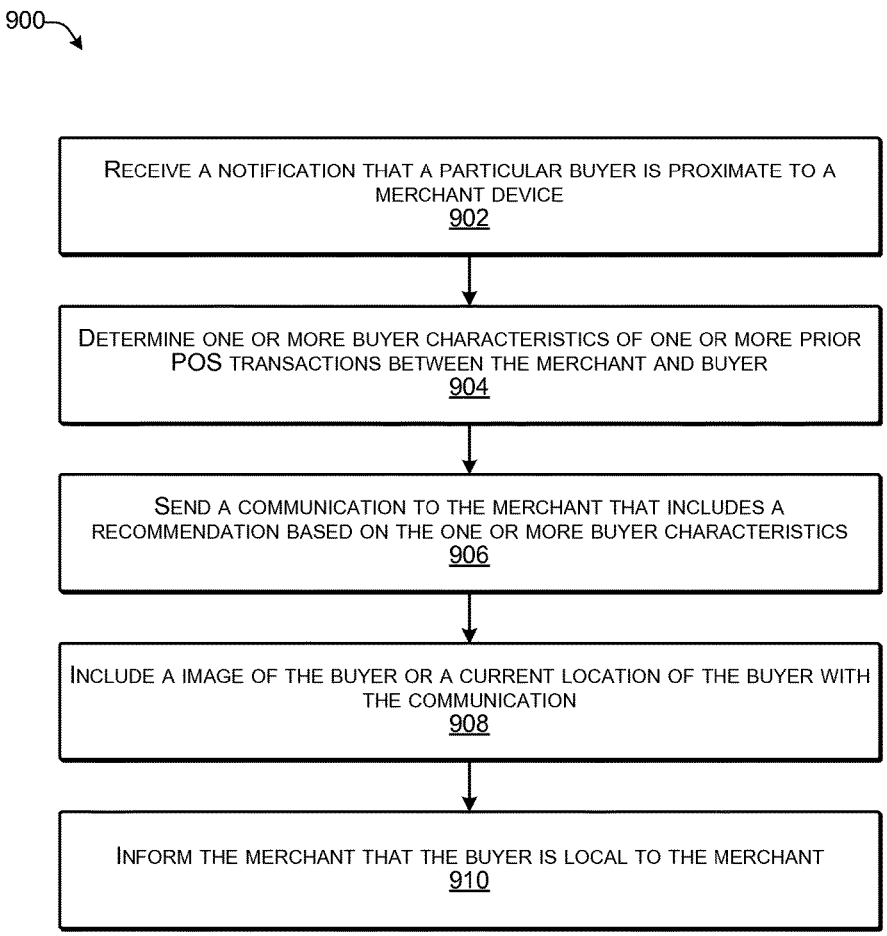
FIG. 9 is a flow diagram illustrating an example process for providing recommendations to merchants according to some implementations.

FIG. 9 is a flow diagram illustrating an example process 900 for providing recommendations to merchants according to some implementations. In some examples, the process may be executed by the one or more service computing devices 102, or by other suitable computing devices.

At 902, the one or more computing devices may receive an indication that a buyer is proximate to a merchant device associated with the merchant. As one example, a buyer device may notify the one or more computing devices that the buyer device is proximate to a merchant device, such as when the buyer uses the buyer device to check-in to the merchant point-of-sale location. As another example, the merchant device may determine that the buyer is proximate to the merchant device such as based on a card swipe, or the like. In some examples, one of the merchant device or the buyer device may determine that they are local to each other based on being within a specified distance of each other, within communication distance, able to communicate over the same WiFi network, or the like.

At 904, the one or more computing devices may determine from a buyer profile associated with the buyer, one or more characteristics of one or more POS transactions that the buyer has conducted with the merchant in the past. For example, the one or more computing devices may refer to a transaction history of transactions that have taken place between the buyer and the merchant for determining one or more interesting characteristics about the transactions that have taken place between the buyer and the merchant. For instance, the one or more computing devices may determine that a threshold period of time has elapsed since the buyer last conducted a transaction with the merchant. As another example, the one or more computing devices may determine that the buyer has spent more than a threshold amount of money on transactions with the merchant over a specified period of time. For example, this may qualify the buyer for special incentives, promotions or the like.

At 906, the one or more computing devices may send to the merchant device a communication that is related to the one or more characteristics of the one or more POS transactions that have taken place between the buyer and the merchant in the past. For example, the communication may point out that the buyer is one of the merchants best customers, is an infrequent customer, or the like, and may recommend an action to be taken by the merchant based on this finding.

At 908, the one or more computing devices may also send to the merchant device an image of the buyer or a indication of a current location of the buyer in the merchant's establishment. This may enable the merchant to recognize or locate the buyer, such as for providing special service to the buyer.

At 910, the one or more computing devices may also inform the merchant that the buyer is local to the merchant. In other words, the recommendation may inform the merchant that the buyer conducts a large number transactions in the geographic region in which the merchant is located, and therefore may be likely to become a regular customer.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 10:
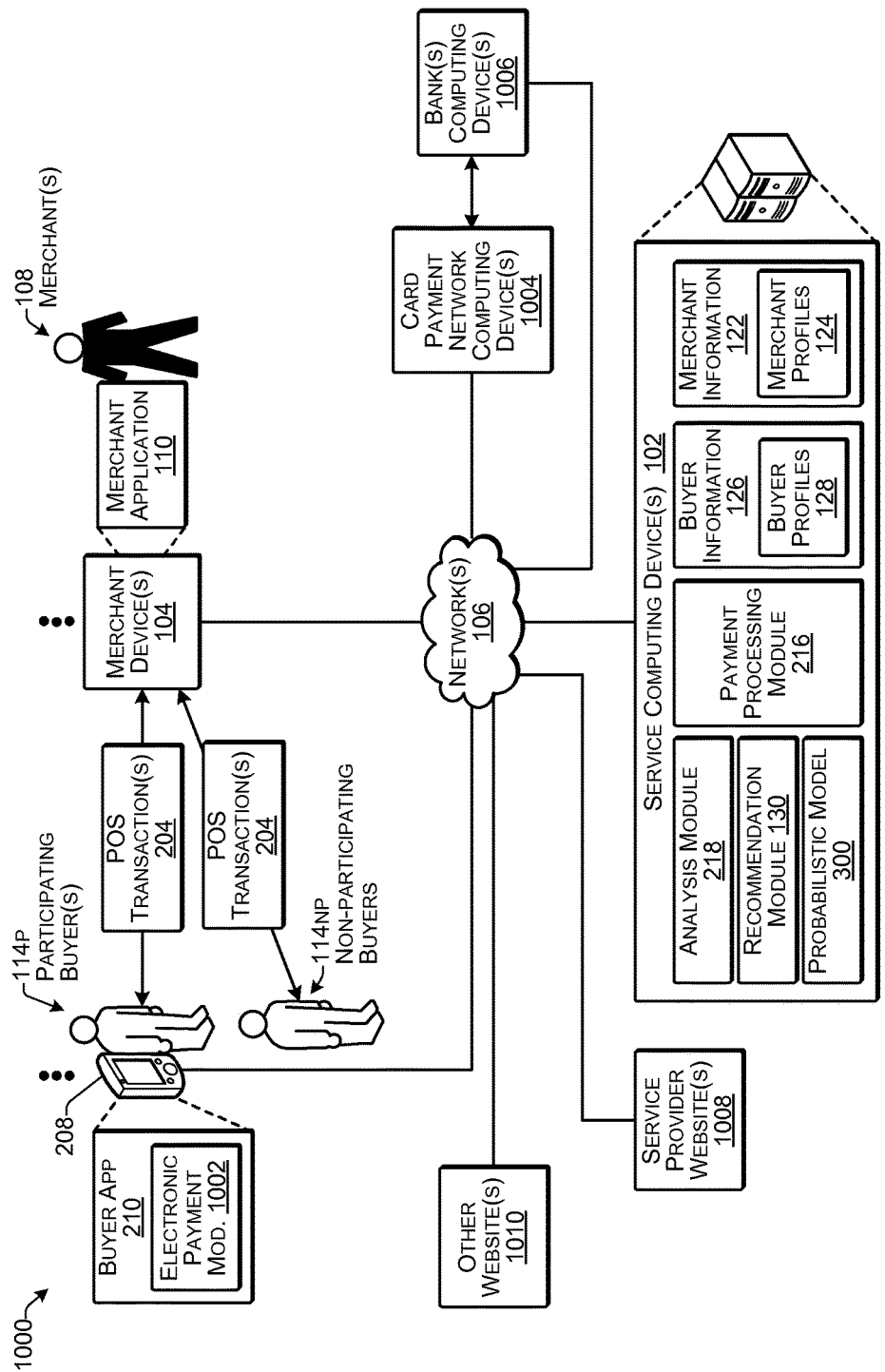
FIG. 10 illustrates an example architecture of a payment and recommendation system for providing a payment and recommendation service according to some implementations.

FIG. 10 illustrates an example architecture of a payment and recommendation system 1000 able to provide a payment and recommendation service according to some implementations. In the example of FIG. 10, the one or more service computing devices 102 of the service provider include the payment processing module 216, which may be executed to provide the payment and transaction functionality, as described herein. The payment processing module 216 and corresponding payment functionality may be implemented as one or more computer programs, or other executable instructions, on the one or more service computing devices 102 in one or more locations, such as for providing the payment systems, components, and techniques described herein.

The example of FIG. 10 illustrates at least one buyer device 208 and at least one merchant device 104. For example, each buyer device 208 may be associated with a participating buyer 114$p$ that participates in the payment system of the service provider. The buyer device 208 may include the buyer application 210, as previously discussed herein, which may include an electronic payment module 1002 that provides functionality for enabling the buyer 114$p$ to make electronic payments using the buyer device 208. In some examples, the buyer application 210 may include various other applications or modules, such as for a buyer dashboard to enable the respective buyer to control information in the buyer's profile, set buyer preferences, and so forth. Further, the merchant device 104 may be associated with a merchant 108 that participates in the payment service provided by the service provider, and the merchant device 104 may include the merchant application 110. As discussed elsewhere herein, the buyer device 208 and the merchant device 104 can each be a computing device able to communicate with each other, with the service computing device 102, and with various other computing devices, through any suitable communication protocols, interfaces, and networks, including the one or more communication networks 106.

The buyer device 208 and the merchant device 104 can each include one or more components, e.g., software or hardware, that are configured to respectively determine a geographic location of the buyer device 208 and/or the merchant device 104, using, for example, various geolocation techniques, e.g., a global positioning system (GPS), cell tower location, wireless access point location, wireless beacon location, and so forth. Further, the buyer device 208 and the merchant device 104 can each be any appropriate device operable to send and receive requests, messages, or other types of information over the one or more networks 106 or directly to each other. Some examples of buyer devices 208 and merchant devices 104 are enumerated below. Additionally, while only a single buyer device and a single merchant device are illustrated in the example of FIG. 10, in some implementation, there may be thousands, hundreds of thousands, or more, of the buyer devices 208 and the merchant devices 104, depending on the number of the participating buyers 114$p$ and the number of merchants 108.

The one or more networks 106 can include any appropriate network, including a wide area network, such as the Internet; a local area network, such an intranet; a wireless network, such as a cellular network, a local wireless network, such as Wi-Fi, and/or close-range wireless communications, such as Bluetooth® and Bluetooth® low energy; a wired network; or any other such network, or any combination thereof. Accordingly, the one or more networks 106 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Accordingly, the service computing devices 102, the merchant devices 104, the buyer devices 208, and the other computing devices discussed herein are able to communicate over the one or more networks 106 using wired or wireless connections, and combinations thereof.

Additionally, in some examples, information may also be obtained with respect to non-participating buyers 114np that do not have an account with the payment service provided through the service computing device 102. The transaction information collected with respect to these buyers may be sent to the service computing device 102, and buyer profiles may be created for the nonparticipating buyers 114np, as discussed above. Should one or more of the non-participating buyers later become a participating buyer, such as by signing up for the electronic payment service, the transaction information of an existing buyer profile for that buyer may be merged with the newly created profile using the information matching and probabilistic modeling techniques described above with respect to FIGS. 3-5. In addition, in some examples, transaction information may be obtained with respect to non-participating merchants (not shown) that do not use a merchant device 104, and this transaction information may be employed when determining recommendations for the merchants 108.

When paying for a transaction, the buyer 114 can provide the amount of payment that is due to the merchant 108 using cash, check, a payment card, or by electronic payment using the buyer application 210 on the buyer device 208. The merchant 108 can interact with the merchant device 104 to process the transaction. During POS transactions 204, the merchant device 104 can collect and send data describing the transactions, including, for example, information describing the items being purchased, the amount of payment received from buyers, buyer information, and so forth. In some implementations, the payment and merchant recommendation service enables card-less payments, i.e., electronic payments, for transactions between the participating buyers 114p and the merchants 108 based on interaction of the buyer 114p with the buyer application 210 and interaction of the merchant 108 with the merchant application 110. Accordingly, in some examples, a card-less payment transaction may include a transaction conducted between a participating buyer 114p and a merchant 108 at a POS location during which a payment account of the buyer 114p is charged without the buyer 114p having to physically present a payment card to the merchant 108 at the POS location. Consequently, the merchant 108 need not receive any details about the financial account of the buyer 114p for the transaction to be processed. As one example, the electronic payment may be charged to a credit card issuer or credit card number that the participating buyer 114p provided when signing up with the service provider for the electronic payment account. As another example, the buyer 114p may have a quantity of money pre-paid in an account maintained for use in making the electronic payments. Other variations will also be apparent to those of skill in the art having the benefit of the disclosure herein.

Before conducting an electronic payment transaction, the participating buyer 114p typically creates a user account with service provider of the payment and recommendation service. The participating buyer 114p can create the user account, for example, by interacting with the buyer application 210 that is configured to perform electronic payment transactions and that may execute on the buyer device 208. When creating a buyer electronic payment account with the payment service, the participating buyer 114p may provide an image including the face of the buyer, data describing a financial account of the buyer 114p, e.g., a credit card number, expiration date, and a billing address. This user information can be securely stored by the payment service, for example, in the buyer information 126, such as in a secure database. Further, the buyer profiles 128 may be created for each buyer 114, which may include information about the buyer and transactions conducted by the buyer.

To accept electronic payments for POS transactions, the merchant 108 typically creates a merchant account with the payment service by providing information describing the merchant including, for example, a merchant name, contact information, e.g., telephone numbers, the merchant's geographic location address, and one or more financial accounts to which funds collected from buyers will be deposited. This merchant information can be securely stored by the payment service, for example, in the merchant information 122, such as in a secure database. Further, a merchant profile 124 may be created for each merchant, which may include information about the merchant and transactions conducted by the merchant.

The payment service is configured to enable electronic payments for transactions. The payment service can include one or more servers that are configured to perform securely electronic financial transactions, e.g., electronic payments for transactions between a buyer and a merchant, for example, through data communicated between the buyer device 208 and the merchant device 104. Generally, when a buyer and a merchant enter into an electronic payment transaction, the transaction is processed by electronically transferring funds from a financial account associated with the user account to a financial account associated with the merchant account.

The payment and recommendation service is configured to send and receive data to and from the buyer device 208 and the merchant device 104. For example, the payment and recommendation service can be configured to send information describing merchants to the buyer application 210 on the buyer device 208 using, for example, the information stored in the merchant information 122. For example, the payment and recommendation service can communicate data describing merchants 108 that are within a threshold geographic distance from a geographic location of the buyer device 208. The data describing the merchants 108 can include, for example, a merchant name, geographic location, contact information, and an electronic catalogue, e.g., a menu, that describes items that are available for purchase from the merchant.

In some embodiments, the payment and recommendation system 1000 is configured to determine whether a geographic location of the buyer device 208 is within a threshold geographic distance from a geographic location of the merchant device 104. The payment and recommendation system 1000 can determine a geographic location of the buyer device 208 using, for example, geolocation data provided by the buyer device 208. Similarly, the payment and recommendation system 1000 can determine a geographic location of the merchant device 104 using, for example, geolocation data provided by the merchant device 104 or using a geographic address, e.g., street address, provided by the merchant. Depending on the implementation, the threshold geographic distance can be specified by the payment and recommendation system 1000, by the buyer, or by the merchant.

Determining whether the buyer device 208 is within a threshold geographic distance of the merchant device 104 can be accomplished in different ways including, for example, determining whether the buyer device 208 is within a threshold geographic radius of the merchant device 104, determining whether the buyer device 208 is within a particular geofence, or determining whether the buyer device 208 can communicate with the merchant device 104 using a specified wireless technology, e.g., Bluetooth® or Bluetooth® low energy (BLE). In some embodiments, the payment and recommendation system 1000 restricts electronic payment transactions between the participating buyer 114p and the merchant 108 to situations where the geographic location of the buyer device 208 is within a threshold geographic distance from a geographic location of the merchant device 104.

The payment and recommendation system 1000 can also be configured to communicate with one or more computing devices 1004 of a card payment network (e.g., MasterCard®, VISA®) over the one or more networks 106 to conduct financial transactions electronically. The payment and recommendation system 1000 can also communicate with one or more bank computing devices 1006 of one or more banks over the one or more networks 106. For example, the payment and recommendation system 1000 may communicate with an acquiring bank, and/or an issuing bank, and/or a bank maintaining buyer accounts for electronic payments.

An acquiring bank may be a registered member of a card association (e.g., Visa®, MasterCard®), and may be part of a card payment network. An issuing bank may issue credit cards and/or other payment cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the buyer may use a debit card instead of a credit card, in which case, the bank computing device(s) of a bank corresponding to the debit card may receive communications regarding a transaction in which the buyer is participating. Additionally, there may be computing devices of other financial institutions involved in some types of transactions or in alternative system architectures, and thus, the foregoing are merely several examples for discussion purposes.

The participating buyer 114p operating the buyer device 208 that is within a threshold geographic distance of the merchant device 104 can interact with the buyer application 210 executed on the buyer device 208 to conduct an electronic payment transaction with the merchant 108. While interacting with the buyer application 210, the buyer 114p can select the merchant 108, from a listing of merchants 108, with whom the buyer 114p wants to enter into an electronic payment transaction. The buyer 114p can select the merchant 108, for example, by selecting a "check in" option associated with the merchant 108. The buyer device 208 can communicate data to the payment and recommendation system 1000 indicating that the buyer 114p has checked in with the merchant 108. In response, the payment and recommendation system 1000 can communicate data to notify the merchant device 104 that the buyer has checked in. The merchant application 110 executing on the merchant device 104 can notify the merchant 108 that the buyer has electronically checked in with the merchant 108 through a display screen of the merchant device 104.

Once checked in, the buyer 114p can obtain or request, items that are available to be acquired from the merchant 108. When the buyer 114p is ready to enter into the card-less payment transaction, the buyer 114p can, for example, approach a point of sale for the merchant 108 and identify him or herself. For example, the buyer 114p can verbally notify the merchant 108 that the buyer 114p wants to enter into a card-less payment transaction and can provide the merchant 108 with the buyer's name. The merchant 108 can then interact with the merchant application 110 to select the buyer 114p, from a listing of buyers that have checked in with the merchant 108, to initiate an electronic payment transaction for the items being acquired by the buyer 114p. For example, the merchant 108 can determine a total amount to charge the buyer 114p for the items being acquired. The buyer 114p can verbally approve the total amount to be paid and, in response, the merchant 108 can submit a request for an electronic payment transaction for the total amount of the transaction to the payment and recommendation system 1000. In response, the payment and recommendation system 1000 can obtain, for example, from the buyer information 126, data describing a financial account associated with the electronic purchase account of the buyer 114p to which the total amount will be charged.

The payment and recommendation system 1000 can then communicate with the computing device 1004 of a card payment network to complete an electronic payment transaction for the total amount to be charged to the buyer's electronic payment account. Once the electronic payment transaction is complete, the payment and recommendation system 1000 can communicate data describing the electronic payment for the transaction to the buyer device 208, e.g., as an electronic receipt, which can, for example, notify the buyer 114p of the total amount charged to the buyer for the electronic payment for the transaction with the particular merchant. Further, while a mobile buyer device 208 is described in this example for purposes of explanation, additional or alternative types of devices may be used in other examples.

In addition, in some examples, the service provider may make available one or more service provider websites 1018 that enable merchants 108 to advertise items on the service provider website(s). For example, merchants 108 may offer items for purchase to buyers on the website. The buyers may purchase the items using a web browser, or other application on a computing device, such as the buyer device 208 or other computing device. The transaction information from these transactions may be provided to the service computing devices 102 to add further to the transaction information in the buyer profiles 128 and the merchant profiles 124.

In addition, the analysis module 218 and/or the recommendation module 130 may access other websites 1010 when determining information about buyers and/or when determining recommendations for merchants, respectively. For example, demographic information and other buyer information may be obtained from the US Census Bureau website, social network sites, a microblog site, or other online presences of the various different buyers. Similarly, geographic information may be obtained from websites that provide maps and other geographic or demographic information, or the like.

Figure 11:
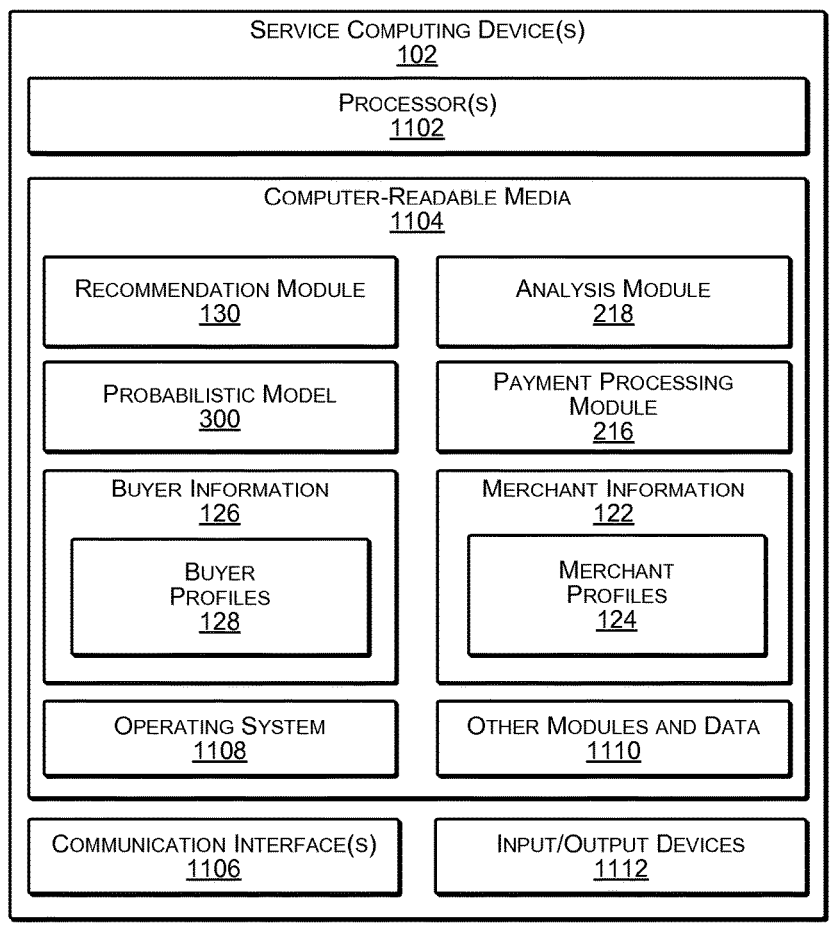
FIG. 11 illustrates select components of one or more example service computing devices according to some implementations.

FIG. 11 illustrates select components of the one or more service computing devices 102 that may be used to implement some functionality of the payment and recommendation service described herein. The one or more service computing devices 102 may be operated by a service provider that provides the payment service and the recommendation service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the one or more service computing devices 102 as being present in a single location, these components and data may alternatively be distributed across different computing devices and different locations in any manner. Consequently, the functions may be implemented by one or more computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, the one or more service computing devices 102 may each include one or more processors 1102, one or more computer-readable media 1104, and one or more communication interfaces 1106. Each processor 1102 may be a single processing unit or a number of processing units, and may include single or multiple computing units or multiple processing cores. The processor(s) 1102 can be implemented as one or more microprocessors, microcomputers, microcontrollers, digital signal processors, central processing units, state machines, logic circuitries, and/or any devices that manipulate signals based on operational instructions. For instance, the processor(s) 1102 may be one or more hardware processors and/or logic circuits of any suitable type specifically programmed or configured to execute the algorithms and processes described herein. The processor(s) 1102 can be configured to fetch and execute computer-readable instructions stored in the computer-readable media 1104, which can program the processor(s) 1102 to perform the functions described herein.

The computer-readable media 1104 may include volatile and nonvolatile memory and/or removable and non-removable media implemented in any type of technology for storage of information, such as computer-readable instructions, data structures, program modules, or other data. Such computer-readable media may include, but is not limited to, RAM, ROM, EEPROM, flash memory or other memory technology, optical storage, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the service computing device(s) 102, the computer-readable media 1104 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1104 may be used to store any number of functional components that are executable by the processors 1102. In many implementations, these functional components comprise instructions or programs that are executable by the processors 1102 and that, when executed, specifically configure the one or more processors 1102 to perform the actions attributed above to the one or more service computing devices 102. Functional components stored in the computer-readable media 1104 may include the recommendation module 130, the analysis module 218 and the payment processing module 216. Additional functional components stored in the computer-readable media 1104 may include an operating system 1108 for controlling and managing various functions of the one or more service computing devices 102.

In addition, the computer-readable media 1104 may store data used for performing the operations described herein. Thus, the computer-readable media may store the merchant information 122, including the merchant profiles 124, and the buyer information 126, including the buyer profiles 128. In addition, the service computing device 102 may store, may access and/or may generate the probabilistic model 300. The service computing device 102 may also include or maintain other functional components and data, such as other modules and data 1110, which may include programs, drivers, etc., and the data used or generated by the functional components. Further, the one or more service computing devices may include many other logical, programmatic and physical components, of which those described above are merely examples that are related to the discussion herein.

The communication interface(s) 1106 may include one or more interfaces and hardware components for enabling communication with various other devices, such as over the network(s) 106. For example, communication interface(s) 1106 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The one or more service computing devices 102 may further be equipped with various input/output devices 1112. Such I/O devices 1112 may include a display, various user interface controls (e.g., buttons, joystick, keyboard, mouse, touch screen, etc.), audio speakers, connection ports and so forth.

Figure 12:
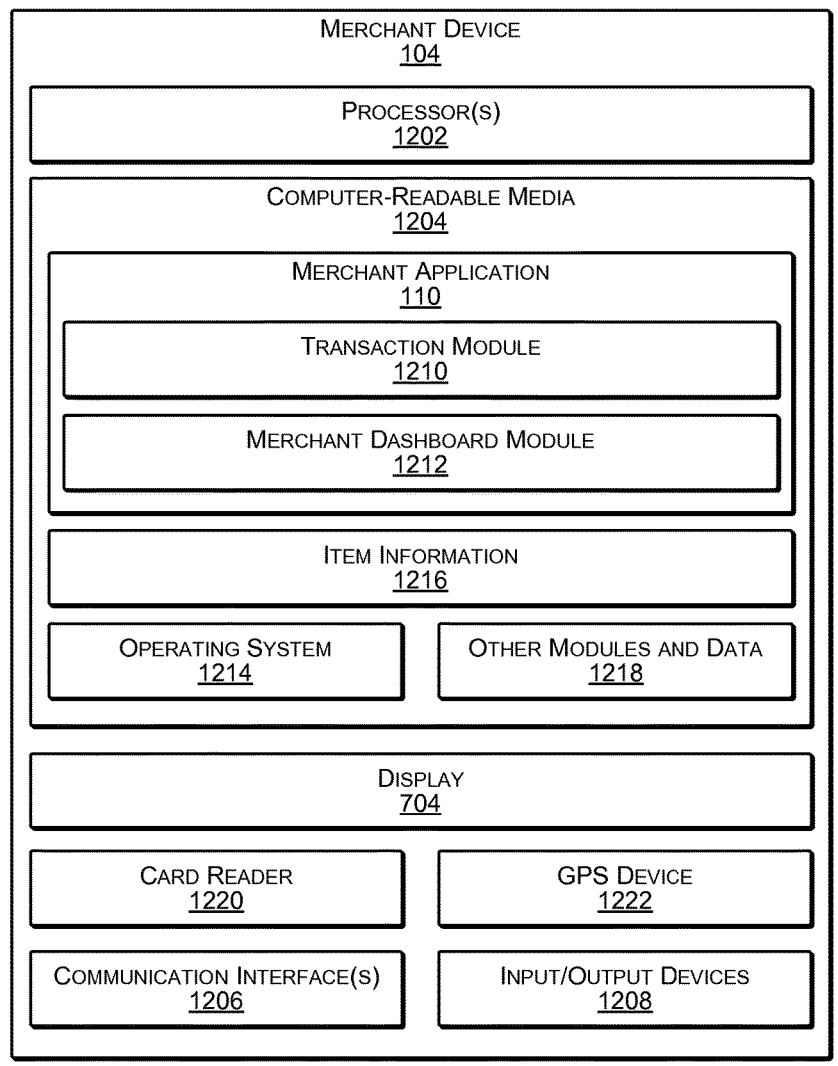
FIG. 12 illustrates select components of an example merchant device according to some implementations.

FIG. 12 illustrates select example components of an example merchant device 104 according to some implementations. The merchant device 104 may be any suitable type of computing device, e.g., portable, semi-portable, semi-stationary, or stationary. Some examples of the merchant device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 104 includes at least one processor 1202, one or more computer-readable media 1204, one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 can be configured to fetch and execute computer-readable processor-executable instructions stored in the computer-readable media 1204.

Depending on the configuration of the merchant device 104, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1204 may include, but is not limited to, RAM, ROM, EEPROM, flash memory, solid-state storage, magnetic disk storage, optical storage, and/or other computer-readable media technology. Further, in some cases, the merchant device 104 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the merchant device 104. Functional components of the merchant device 104 stored in the computer-readable media 1204 may include the merchant application 110. In this example, the merchant application 110 includes a transaction module 1210 and a merchant dashboard module 1212. For example, the transaction module 1210 may be present an interface to enable the merchant to conduct transactions, receive payments, and so forth, as well as communicating with the service computing devices 102 for processing payments and sending transaction information. Further, the merchant dashboard module 1212 may present an interface to enable the merchant to manage the merchant's account, the merchant profile, merchant preferences, view saved or new merchant recommendations, and the like. Additional functional components may include an operating system 1214 for controlling and managing various functions of the merchant device 104 and for enabling basic user interactions with the merchant device 104.

In addition, the computer-readable media 1204 may also store data, data structures and the like, that are used by the functional components. For example, data stored by the computer-readable media 1204 may include item information 1216 that includes information about the items offered by the merchant, which may include images of the items, descriptions of the items, prices of the items, and so forth. Depending on the type of the merchant device 104, the computer-readable media 1204 may also optionally include other functional components and data, such as other modules and data 1218, which may include programs, drivers, etc., and the data used or generated by the functional components. Further, the merchant device 104 may include many other logical, programmatic and physical components, of which those described are merely examples that are related to the discussion herein.

The communication interface(s) 1206 may include one or more interfaces and hardware components for enabling communication with various other devices, such as over the network(s) 106 or directly. For example, communication interface(s) 1206 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 12 further illustrates that the merchant device 104 may include the display 704 mentioned above. Depending on the type of computing device used as the merchant device 104, the display 704 may employ any suitable display technology. For example, the display 704 may be a liquid crystal display, a plasma display, a light emitting diode display, an OLED (organic light-emitting diode) display, an electronic paper display, or any other suitable type of display able to present digital content thereon. In some examples, the display 704 may have a touch sensor associated with the display 704 to provide a touchscreen display configured to receive touch inputs for enabling interaction with a graphic interface presented on the display 704. Accordingly, implementations herein are not limited to any particular display technology. Alternatively, in some examples, the merchant device 104 may not include the display 704, and information may be presented by other means, such as aurally.

The merchant device 104 may further include the one or more I/O devices 1208. The I/O devices 1208 may include speakers, a microphone, a camera, and various user controls (e.g., buttons, a joystick, a keyboard, a keypad, etc.), a haptic output device, and so forth.

In addition, the merchant device 104 may include or may be connectable to a card reader 1220. In some examples, the card reader may plug in to a port in the merchant device, such as a microphone/headphone port, a data port, or other suitable port. The card reader may include a read head for reading a magnetic strip of a payment card, and further may include encryption technology for encrypting the information read from the magnetic strip. Alternatively, numerous other types of card readers may be employed with the merchant devices 104 herein, depending on the type and configuration of the merchant device 104.

Other components included in the merchant device 104 may include various types of sensors, which may include a GPS device 1222 able to indicate location information, as well as other sensors (not shown) such as an accelerometer, gyroscope, compass, proximity sensor, and the like. Additionally, the merchant device 104 may include various other components that are not shown, examples of which include removable storage, a power source, such as a battery and power control unit, and so forth.

Figure 13:
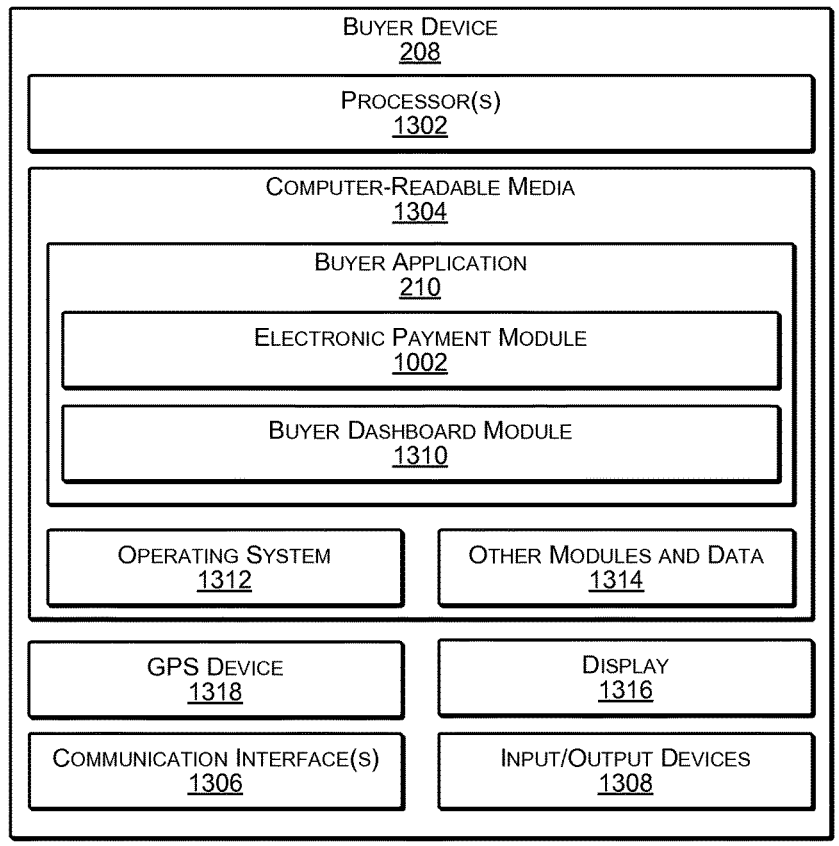
FIG. 13 illustrates select components of an example buyer device according to some implementations.

FIG. 13 illustrates select example components of the buyer device 208 that may implement the functionality described above according to some examples. The buyer device 208 may be any of a number of different types of portable computing devices. Some examples of the buyer device 208 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 13, the buyer device 208 includes components such as at least one processor 1302, one or more computer-readable media 1304, the one or more communication interfaces 1306, and one or more input/output (I/O) devices 1314. Each processor 1302 may itself comprise one or more processors or processing cores. For example, the processor 1302 can be implemented as one or more microprocessors, microcomputers, microcontrollers, digital signal processors, central processing units, state machines, logic circuitries, and/or any devices that manipulate signals based on operational instructions. In some cases, the processor 1302 may be one or more hardware processors and/or logic circuits of any suitable type specifically programmed or configured to execute the algorithms and processes described herein. The processor 1302 can be configured to fetch and execute computer-readable processor-executable instructions stored in the computer-readable media 1304.

Depending on the configuration of the buyer device 208, the computer-readable media 1304 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1304 may include, but is not limited to, RAM, ROM, EEPROM, flash memory, solid-state storage, magnetic disk storage, optical storage, and/or other computer-readable media technology. Further, in some cases, the buyer device 208 may access external storage, such as RAID storage systems, storage arrays, network attached storage, storage area networks, cloud storage, or any other medium that can be used to store information and that can be accessed by the processor 1302 directly or through another computing device or network. Accordingly, the computer-readable media 1304 may be computer storage media able to store instructions, modules or components that may be executed by the processor 1302. Further, when mentioned, non-transitory computer-readable media exclude media such as energy, carrier signals, electromagnetic waves, and signals per se.

The computer-readable media 1304 may be used to store and maintain any number of functional components that are executable by the processor 1302. In some implementations, these functional components comprise instructions or programs that are executable by the processor 1302 and that, when executed, implement operational logic for performing the actions and services attributed above to the buyer device 208. Functional components of the buyer device 208 stored in the computer-readable media 1304 may include the buyer application 210, as discussed above. In this example, the buyer application 210 includes the electronic payment module 1002, as discussed above, and a buyer dashboard module 1310. For example, the buyer dashboard module 1310 may present the buyer with an interface for managing the buyer's account, changing information, changing preferences, and so forth. Additional functional components may include an operating system 1312 for controlling and managing various functions of the buyer device 208 and for enabling basic user interactions with the buyer device 208.

In addition, the computer-readable media 1304 may also store data, data structures and the like, that are used by the functional components. Depending on the type of the buyer device 208, the computer-readable media 1304 may also optionally include other functional components and data, such as other modules and data 1306, which may include applications, programs, drivers, etc., and the data used or generated by the functional components. Further, the buyer device 208 may include many other logical, programmatic and physical components, of which those described are merely examples that are related to the discussion herein.

The communication interface(s) 1306 may include one or more interfaces and hardware components for enabling communication with various other devices, such as over the network(s) 106 or directly. For example, communication interface(s) 1306 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 13 further illustrates that the buyer device 208 may include a display 1316. Depending on the type of computing device used as the buyer device 208, the display may employ any suitable display technology. For example, the display 1316 may be a liquid crystal display, a plasma display, a light emitting diode display, an OLED (organic light-emitting diode) display, an electronic paper display, or any other suitable type of display able to present digital content thereon. In some examples, the display 1316 may have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the buyer device 208 may not include a display.

The buyer device 208 may further include the one or more I/O devices 1308. The I/O devices 1308 may include speakers, a microphone, a camera, and various user controls (e.g., buttons, a joystick, a keyboard, a keypad, etc.), a haptic output device, and so forth.

Other components included in the buyer device 208 may include various types of sensors, which may include a GPS device 1318 able to indicate location information, as well as other sensors (not shown) such as an accelerometer, gyroscope, compass, proximity sensor, and the like. Additionally, the buyer device 208 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more computer-readable media storing instructions executable by the one or more processors, wherein the instructions program the one or more processors to:
receive a notification from a buyer application executed on a buyer device associated with a buyer determined to be located within a geofenced region of one or more wireless beacons corresponding to one or more merchant devices associated respectively with a merchant;
receive, in response to receiving the notification, first transaction information for transactions, wherein an individual merchant device of the one or more merchant devices is associated with a point-of-sale (POS) location, and wherein the first transaction information includes buyer information and item purchase information for individual transactions of the transactions;
associate the first transaction information with respective buyer profiles, based at least in part on the buyer information, wherein a first buyer profile of the buyer profiles includes the buyer information and the item purchase information for at least one transaction of the transactions, wherein the item purchase information for an individual transaction includes a merchant identifier of a merchant participating in the individual transaction, and at least one of item information related to the individual transaction, an amount, a date, a time, or the POS location of the individual transaction;
receive second transaction information indicating, at least in part, that the first buyer profile and a second buyer profile are associated with the same buyer;
identify at least a portion of the first buyer profile that differs from the buyer information and the item purchase information of the second buyer profile;
combine the portion of the first buyer profile with the buyer information and the item purchase information of the second buyer profile;
remove the first buyer profile based at least in part on the combining;
identify a first merchant of the one or more merchants;
determine, based at least in part on identifying the first merchant, a subset of buyer profiles comprising at least the second buyer profile, wherein individual buyer profiles of the buyer profiles in the subset include at least one transaction with the first merchant and at least one transaction with a second merchant;
determine a common buyer characteristic among at least some of the buyer profiles in the subset, wherein the common buyer characteristic is determined at least in part from at least one of:
the item purchase information included in the buyer profiles in the subset, or
the buyer information included in the buyer profiles in the subset; and
send a communication to the individual merchant device associated with the first merchant based at least in part on the common buyer characteristic determined from the buyer profiles in the subset, wherein the communication is related to a recommendation associated with the common buyer characteristic and wherein the communication includes an identifier of one of the one or more wireless beacons the buyer is in closest proximity to, informing the first merchant of a current location of the buyer.

2. The system as recited in claim 1, wherein the second merchant is classified in a same category as the first merchant, wherein the common buyer characteristic is related to the at least one transaction with the second merchant.

3. The system as recited in claim 1, wherein the second merchant is classified in a same geographic region as the first merchant, wherein the common buyer characteristic is related to the at least one transaction with the second merchant.

4. The system as recited in claim 1, wherein the instructions further program the one or more processors to determine the common buyer characteristic among at least some of the buyer profiles in the subset based at least in part on a frequency of occurrence of the common buyer characteristic among the buyer profiles in the subset being greater than a frequency of occurrence of the buyer characteristic among the plurality of buyer profiles by a threshold amount.

5. A method comprising:
receiving, by one or more processors, a notification from a buyer application executed on a buyer device of a buyer determined to be located within a geofenced region of one or more wireless beacons corresponding to one or more merchant devices associated respectively with a merchant;
receiving, by the one or more processors and in response to receiving the notification, first transaction information for point of sale (POS) transactions;
associating the first transaction information with respective buyer profiles of buyer profiles;
receive second transaction information indicating, at least in part, that a first buyer profile and a second buyer profile are associated with the buyer;
identify at least a portion of the first buyer profile that differs from the first transaction information of the second buyer profile;
combine the portion of the first buyer profile with the first transaction information of the second buyer profile;
remove the first buyer profile based at least in part on the combining;
identifying a first merchant from the one or more merchants;
determining, based at least in part on identifying the first merchant, a subset of buyer profiles comprising at least the second buyer profile based at least in part on at least a portion of the buyer profiles in the subset including transaction information related to the first merchant and a second merchant;
determining at least one characteristic associated with at least some of the buyer profiles in the subset; and
sending a communication to one of the one or more merchant devices associated with the first merchant, wherein the communication is related to a recommendation associated with the at least one characteristic and wherein the communication includes an identifier of one of the one or more wireless beacons the buyer is in closest proximity to, informing the first merchant of a current location of the buyer.

6. The method as recited in claim 5, wherein determining the at least one characteristic comprises determining a buyer demographic characteristic based at least in part on at least one of: buyer residence information; buyer age; buyer sex; buyer affluence; buyer ethnicity; buyer language; buyer education; buyer marital status; buyer occupation; buyer religion; buyer political affiliation; or buyer association membership.

7. The method as recited in claim 5, wherein determining the at least one characteristic comprises determining a buyer behavioral characteristic based at least in part on at least one of a geographic location at which an item was acquired, a type of item acquired, a time at which an item was acquired, a merchant from which an item was acquired, items that were acquired together, items that were acquired within a threshold time of each other, a descriptor about an item acquired, or price paid for an item.

8. The method as recited in claim 5, wherein determining the at least one characteristic is based at least in part on POS transactions with one or more of the merchants other than the first merchant and the second merchant.

9. The method as recited in claim 5, wherein determining the at least one characteristic is based at least in part on the at least one buyer characteristic occurring among the at least some of the buyer profiles in the subset with a frequency of occurrence that is greater, by a threshold amount, than a frequency of occurrence of the at least one buyer characteristic among the buyer profiles.

10. The method as recited in claim 5, further comprising associating the transaction information with the respective buyer profiles based at least in part on determining that buyer information included with the transaction information matches buyer information in the respective buyer profiles with a level of confidence that exceeds a threshold level of confidence.

11. The method as recited in claim 5, wherein the communication is further related to at least one of:
hours of operation of the first merchant;
a geographic region for expanding a business of the first merchant; or
an item not currently offered by the first merchant.

12. The method as recited in claim 5, wherein the communication further comprises an image of the particular buyer.

13. One or more non-transitory computer-readable media maintaining instructions that, when executed by one or more processors, cause the one or more processors to perform operations comprising:
receiving a notification from a buyer application executed on a buyer device associated with a buyer determined to be located within a geofenced region of one or more wireless beacons corresponding to one or more merchant devices associated respectively with a merchant;
receiving, in response to receiving the notification, first transaction information from one of the one or more merchant devices associated with a first merchant for point of sale (POS) transactions;
associating the first transaction information with respective buyer profiles, wherein the respective buyer profiles include at least one transaction with a first merchant and at least one transaction with a second merchant;
receiving second transaction information indicating, at least in part, that a first buyer profile and a second buyer profile are associated with the buyer;
identifying at least a portion of the first buyer profile that differs from the first transaction information of the second buyer profile;
combining the portion of the first buyer profile with the first transaction information of the second buyer profile;
removing the first buyer profile based at least in part on the combining;
determining, from the second buyer profile, one or more characteristics based at least in part on the first transaction information; and
sending, to the one of the one or more merchant devices, a communication, wherein the communication is related to a recommendation associated with the one or more characteristics and wherein the communication includes an identifier of one of the one or more wireless beacons the buyer is in closest proximity to, informing the first merchant of a current location of the buyer.

14. The one or more non-transitory computer-readable media as recited in claim 13, wherein the communication comprises a recommended the action to be taken by the first or second merchant with respect to the buyer based at least in part on the one or more characteristics.

15. The one or more non-transitory computer-readable media as recited in claim 13, wherein the communication further comprises an image of the buyer.

16. The one or more non-transitory computer-readable media as recited in claim 13, wherein determining the one or more characteristics comprises determining that more than a threshold period of time has elapsed since the buyer last conducted a POS transaction with the first or second merchant.

17. The one or more non-transitory computer-readable media as recited in claim 13, wherein determining the one or more characteristics comprises determining that the buyer has spent more than a threshold amount of money on POS transactions with the first or second merchant over a period time.

18. The one or more non-transitory computer-readable media as recited in claim 13, the operations further comprising:
determining, from the second buyer profile, that the buyer has conducted more than a threshold number of POS transactions within a geographic location associated with the first or second merchant; and
determining that the buyer is local to the geographic region,
and wherein the communication further indicates that the buyer is local to the first or second merchant.

19. A system comprising:
one or more processors; and
one or more computer-readable media storing instructions executable by the one or more processors, wherein the instructions program the one or more processors to:
receive, from merchant devices associated with respective merchants, first transaction information for point of sale (POS) transactions;
associate the first transaction information with respective buyer profiles;
receive second transaction information indicating, at least in part, that a first buyer profile and a second buyer profile are associated with a buyer;
identify at least a portion of the first buyer profile that differs from first transaction information of the second buyer profile;
combine the portion of the first buyer profile with the first transaction information of the second buyer profile;
remove the first buyer profile based at least in part on the combining;
identify a first merchant of the merchants;
receive notifications from buyer applications executed on buyer devices determined to be located within a geofenced region of one or more wireless beacons corresponding to one of the merchant devices associated with a first merchant:

determine, based on the received notifications, a subset of buyer profiles corresponding to the buyer devices comprising at least the second buyer profile that include transaction information for one or more POS transactions of the first merchant and a second merchant;

determine at least one common buyer characteristic among at least some of the buyer profiles in the subset, wherein the at least one common buyer characteristic is associated with at least one item offered by the first merchant; and sending a communication to the one of the merchant devices associated with the first merchant, wherein the communication is related to a recommendation associated with the at least one common buyer characteristic and wherein the communication includes an identifier of one of the one or more wireless beacons the buyer is in closest proximity to, informing the first merchant of a current location of the buyer.

20. The system as recited in claim 19, wherein the instructions program the one or more processors to determine the at least one common buyer characteristic from at least one of: buyer residence information; buyer age; buyer sex; buyer affluence; buyer ethnicity; buyer language; buyer education; buyer marital status; buyer occupation; buyer religion; buyer political affiliation; or buyer association membership.

21. The system as recited in claim 19, wherein the instructions program the one or more processors to determine the at least one common buyer characteristic from at least one of a geographic location at which an item was acquired, a type of item acquired, a time at which an item was acquired, a merchant from which an item was acquired, items that were acquired together, items that were acquired within a threshold time of each other, a descriptor about an item acquired, or price paid for an item.

22. The system as recited in claim 20, wherein the instructions program the one or more processors to determine the at least one buyer characteristic based at least in part on the at least one common buyer characteristic occurring among the at least some of the buyer profiles in the subset with a frequency of occurrence that is greater, by a threshold amount, than a frequency of occurrence of the buyer characteristic among the plurality of buyer profiles.

23. The system as recited in claim 20, wherein the communication further includes a recommendation that the first merchant begin offering an item not currently offered by the first merchant.

* * * * *